United States Patent
Halbfinger et al.

(10) Patent No.: US 12,373,788 B2
(45) Date of Patent: Jul. 29, 2025

(54) DISTRIBUTED LEDGER INVENTORY MANAGEMENT

(71) Applicants: HKT Services Limited, Hong Kong (HK); PCCW Global, Inc., Herndon, VA (US); PCCW Global (Australia) Pty Limited, Sydney (AU)

(72) Inventors: Marc Halbfinger, Hong Kong (HK); Ioannis Giokas, New York, NY (US); Dave Haitao Xiong, Brisbane (AU); Jordan Moeser, Brisbane (AU); Lawrence Chee Boon Lim, Brisbane (AU)

(73) Assignees: HKT Services Limited, Hong Kong (HK); PCCW Global, Inc., Herndon, VA (US); PCCW Global (Australia) Pty Limited, Sydney (AU)

( * ) Notice: Subject to any disclaimer, the term of this patent is extended or adjusted under 35 U.S.C. 154(b) by 280 days.

(21) Appl. No.: 17/689,680

(22) Filed: Mar. 8, 2022

(65) Prior Publication Data

US 2023/0289724 A1    Sep. 14, 2023

(51) Int. Cl.
*G06Q 10/0875*    (2023.01)

(52) U.S. Cl.
CPC ..... *G06Q 10/0875* (2013.01); *G06Q 2220/00* (2013.01)

(58) Field of Classification Search
CPC .......... G06Q 10/0875; G06Q 2220/00; G06Q 10/087
See application file for complete search history.

(56) References Cited

U.S. PATENT DOCUMENTS

| | | | |
|---|---|---|---|
| 10,095,888 B1 * | 10/2018 | Lee | H04L 9/14 |
| 10,163,079 B1 | 12/2018 | Brock et al. | |
| 10,635,500 B2 | 4/2020 | Skjolsvold et al. | |
| 10,789,590 B2 | 9/2020 | Tran et al. | |
| 10,984,474 B1 * | 4/2021 | Seymour | G06Q 20/389 |
| 11,128,437 B1 * | 9/2021 | Nossik | H04L 9/0637 |

(Continued)

FOREIGN PATENT DOCUMENTS

| | | |
|---|---|---|
| CN | 112074856 B | 10/2021 |
| WO | 2020028917 A1 | 2/2020 |

OTHER PUBLICATIONS

International Search Report and Written Opinion dated Jun. 22, 2023 for PCT Application No. PCT/US2023/014455.

*Primary Examiner* — A. Hunter Wilder
(74) *Attorney, Agent, or Firm* — EIP US LLP

(57) ABSTRACT

Inventory management systems, computer-implemented methods and computer readable mediums, for use in managing resources are disclosed. The method includes receiving a resource request, from a user, identifying one or more resources from a pool of resources that can fulfil the resource request, generating a smart contract comprising a resource service agreement for the identified one or more resources, storing data associated with the smart contract in a distributed ledger, arranging for the identified one or more resources to be provisioned to the user, updating the data associated with the smart contract stored in the distributed ledger to record usage of the one or more identified resources, and generating a settlement request based on the updated data associated with the smart contract stored in the distributed ledger.

23 Claims, 8 Drawing Sheets

(56) References Cited

U.S. PATENT DOCUMENTS

| | | |
|---|---|---|
| 2015/0379510 A1 | 12/2015 | Smith |
| 2017/0103391 A1 | 4/2017 | Wilson, Jr. et al. |
| 2017/0116693 A1 | 4/2017 | Rae et al. |
| 2018/0218176 A1 | 8/2018 | Voorhees et al. |
| 2018/0337917 A1* | 11/2018 | Wallace ................ G06V 40/70 |
| 2019/0158270 A1 | 5/2019 | Berti |
| 2021/0377310 A1* | 12/2021 | Fernando ............ H04L 63/0236 |
| 2023/0244546 A1* | 8/2023 | Dhoot ....................... H04L 9/50 |
| | | 718/104 |

* cited by examiner

DISTRIBUTED LEDGER INVENTORY MANAGEMENT

BACKGROUND OF THE INVENTION

Field of the Invention

The present disclosure relates to systems and methods for inventory management. The disclosure has particular, but not exclusive, relevance to managing pools of resources and maintaining immutable records of the usage of resources in the pool using a distributed ledger, such as a blockchain.

Description of the Related Technology

Inventory management systems are used to organize, maintain, sell and track usage of resources. In such systems, usage of any resource can be tracked. Conventional inventory management systems may be required to manage very large numbers of records to accurately reflect the resources that are being managed. To achieve this, conventional inventory management systems require considerable computational resources, memory requirements and extensive human input to create, verify and maintain records held by the system.

Hence there is a need for systems and methods that are capable of overcoming one or more of the above identified challenges.

SUMMARY

According to a first embodiment, there is provided an inventory management system for use in managing resources, the system comprising at least one memory and at least one processor, the memory storing instructions, which, when executed by the at least one processor, cause the at least one processor to: receive a resource request, from a user; identify one or more resources from a pool of resources that can fulfil the resource request; generate a smart contract comprising a resource service agreement for the identified one or more resources; store data associated with the smart contract in a distributed ledger; arrange for the identified one or more resources to be provisioned to the user; update the data associated with the smart contract stored in the distributed ledger to record usage of the one or more identified resources; and generate a settlement request based on the updated data associated with the smart contract stored in the distributed ledger.

According to a second embodiment, there is provided a computer-implemented method comprising: receiving a resource request, from a user; identifying one or more resources from a pool of resources that can fulfil the resource request; generating a smart contract comprising a resource service agreement for the identified one or more resources; storing data associated with the smart contract in a distributed ledger; arranging for the identified one or more resources to be provisioned to the user; updating the data associated with the smart contract stored in the distributed ledger to record usage of the one or more identified resources; and generating a settlement request based on the updated data associated with the smart contract stored in the distributed ledger.

According to a third embodiment, there is provided a non-transitory computer readable medium storing instructions, which when executed by one or more processors, performs a method for managing resources, the method comprising: receiving a resource request, from a user; identifying one or more resources from a pool of resources that can fulfil the resource request; generating a smart contract comprising a resource service agreement for the identified one or more resources; storing data associated with the smart contract in a distributed ledger; arranging for the identified one or more resources to be provisioned to the user; updating the data associated with the smart contract stored in the distributed ledger to record usage of the one or more identified resources; and generating a settlement request based on the updated data associated with the smart contract stored in the distributed ledger.

Further features and advantages will become apparent from the following description of embodiments, given by way of example only, which is made with reference to the accompanying drawings.

DETAILED DESCRIPTION OF CERTAIN INVENTIVE EMBODIMENTS

Before proceeding with the detailed description, it is to be appreciated that the present teaching is by way of example only, not by limitation. The concepts herein are not limited to use or application with a specific system or method for providing or using inventory management methods and an inventory management system. Thus, although the instrumentalities described herein are for the convenience of explanation shown and described with respect to exemplary embodiments, it will be understood and appreciated that the principles herein may be applied equally in other types of systems and methods for managing inventory.

This disclosure describes exemplary embodiments with reference to the Figures, in which like numbers represent the same or similar elements. Further, with the respect to the numbering of the same or similar elements, it is to be understood that the leading values identify the Figure in which the element is first identified and described, e.g., element 100 first appears in FIG. 1.

Novel methods for managing inventory are disclosed. In the following description, the inventory being managed relates to communication services, such as the provision of telephone and internet services. However, the principles described herein may be applied equally to any other type of managed resource, including the provision of software services, logistic services, data processing services, data storage services, cloud computing services, management and tracking of physical objects and so forth.

Overview of Provisioning Resources

Figure 1:
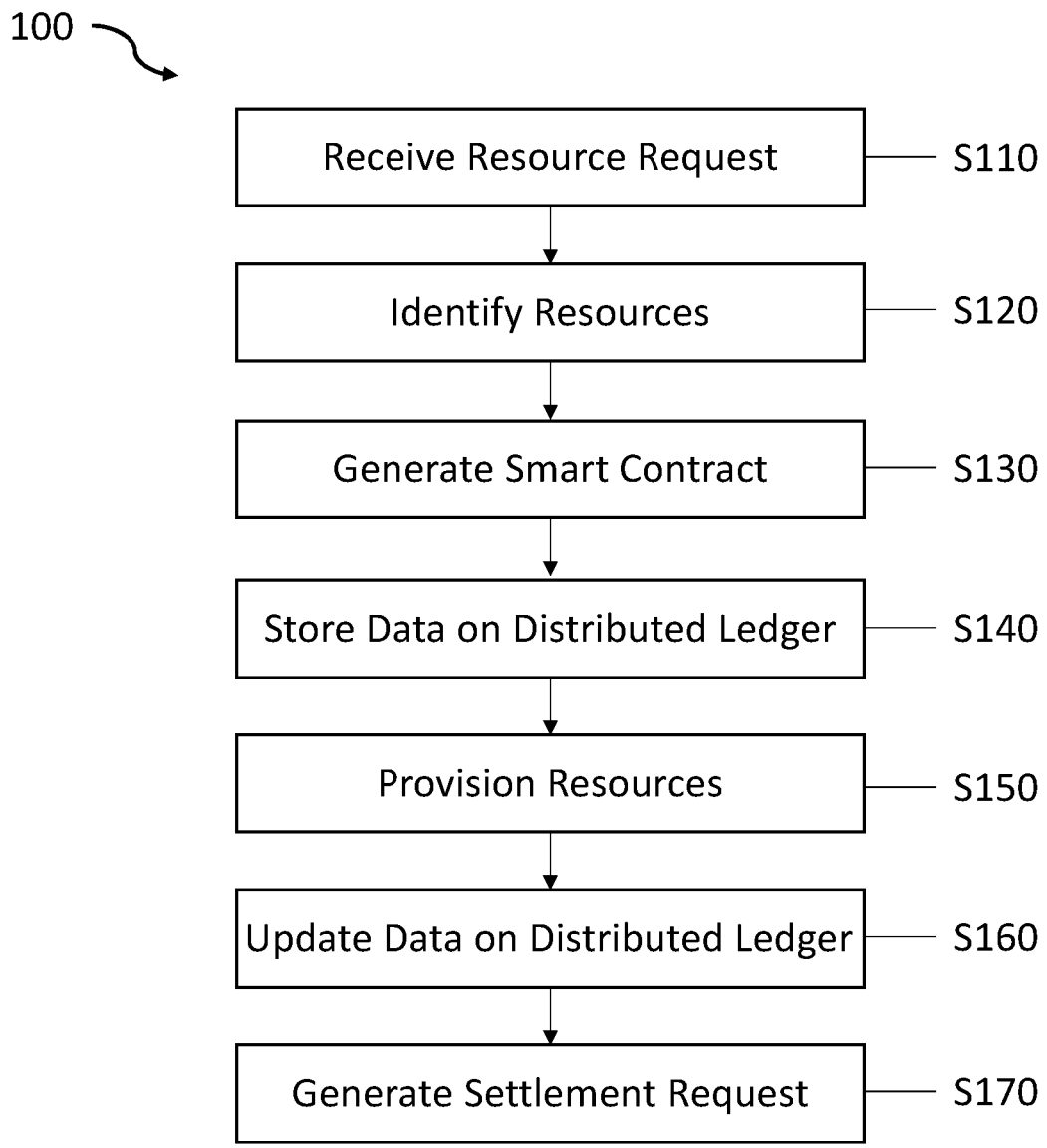
FIG. 1 shows an inventory management method for use in managing resources.

FIG. 1 provides a high-level overview of an inventory management method which enables provisioning of resources in response to a user request, and the subsequent generation of a settlement request covering the use of the provisioned resource. As shown in FIG. 1, an inventory management method 100 can begin by receiving a resource request at step S110.

The received resource request may be in any form that can be understood or interpreted by a computer. The received resource request indicates the type of resource that a user sending the request wishes access to. For example, the resource request may indicate a request for an Internet connection, a telephone service or any other communications resource. In addition to the type of resource, the resource request may include further requirements which define the requested resource requirements. For example, when requesting an Internet connection, the resource request may further specify one or more of a required bandwidth, a required upload data speed, a required download data speed, a required service guarantee, a required data allowance and so forth. Thus, in one example, the received resource request may specify an Internet connection, capable of 50 Mbps (megabits per second) upload, 200 Mbps download, specifying an always on connection guarantee with an unlimited data allowance.

In some examples, the resource request may be more speculative and may comprise a request for information about the resources that are available to be requested. In this case, an additional process may be implemented in which a summary of some or all of the resources available to be requested may be sent to the user, prompting a further, more specific, resource request to be received thereafter. For brevity this additional process is not illustrated. In other examples, the initial resource request may be highly specific, indicating, for example, specific ports and connections which the user wants access to.

Once a resource request has been received, at step S120, one or more resources from a pool of available resources are identified, based on the requirements of the resource request. Any known method of matching available resources to a resource request may be used. Where more than one available resource matches the resource request, the first suitable resource that is identified may be used in the steps of the method that follow. In other examples, other factors such as cost, availability, or geographic distance may be used to select a suitable resource amongst a group of suitable available resources. In some circumstances, no available resource can fulfil all requirements of the request. In such cases, resource(s) which most closely match the request will be identified. In some examples, multiple resources may be required to fulfil a single resource request. In certain examples, the user requesting the resource may be presented a number of suitable available resources and asked to select their preferred resource. In other examples, the user is not provided with such a choice.

Following identification of one or more resources to be used to fulfil the resource request, at step S130, a smart contract is generated, which defines a contractual agreement setting out parameters (i.e. terms) for the supply of the requested resources to the requesting user. Where the resources supplied to the user are provided by an operator of the inventory management system, the smart contract comprises a two-party agreement to supply the requested resource. In other examples, where one or more of the resources provided to the user are supplied by a third-party supplier, the smart contract may comprise a multi-party agreement, or multiple smart contracts may be required. For simplicity, a two-party smart contract will be described in the following.

The smart contract may be generated by any known mechanism. Several example methods of creating the smart contract will be discussed in more detail in latter sections of the description. For now, it is sufficient to understand that a smart contract is generated, and that the smart contract comprises a resource service agreement. The resource service agreement sets out parameters for supplying the requested resource to the user, and as such may comprise a resource identifier, a user identifier and a billing agreement (i.e. a duration over which the resource will be supplied, a billing frequency, payment terms and agreed charges for a given resource).

Once the smart contract has been generated, the smart contract may need to be validated by the requesting user to signal their agreement to the terms of the resource service agreement. In this case, the smart contract may be sent to the user and the method stops until a validated smart contract is returned. In other examples, the initial resource request may comprise either an explicit or implicit agreement to any provided resource service agreement, in which case the method may continue without the need for a user validation step. In other examples, user validation of the smart contract may be received after supply of the requested resource.

At step S140, data associated with the smart contract is stored on a distributed ledger. The distributed ledger may be, for example, a blockchain suitable for storing smart contracts. The distributed ledger may be implemented on a Ethereum-based blockchain, Ripple-based blockchain, Hyperledger Fabric based blockchain, or any other suitable distributed ledger technology. In some examples, the entirety of the smart contract may be stored on the distributed ledger, while in other examples only smart contract identifying information is stored on the distributed ledger with the smart contract being stored on a separate medium.

At step S150, the requested resources are provisioned to the user. For example, where an internet connection is requested, the user may now be provided with the requested internet connection, in accordance with the resource service agreement.

The user's use of the provisioned resources may thereafter be measured or otherwise monitored. For example, in the case of an internet connection, data usage, downloaded data size and/or uploaded data size may be continuously or periodically monitored. In other examples, where the provisioned resources relate to logistic services, the number of resources delivered, picked up and/or distances travelled may be monitored. In further examples, where the provisioned resources relate to cloud storage, upload, download and/or stored data sizes may be monitored. Similarly, where the provisioned resources relate to cloud computing, upload, download and/or compute cycles may be monitored. Essentially, any metric which can be measured and provides insight into the user's use of a provisioned resource may be monitored.

At step S160 the data associated with the smart contract is updated, based on the user's usage of the provisioned resources. In some examples, the smart contract stored on the blockchain may itself be refreshed or renewed as part of this updating process. In other examples, only part of the data associated with the smart contract may be updated. The updated data is indicative of the user's usage of the provisioned resource and may comprise a summary of usage over a given time period. For example, for an internet connection, the updated data may be indicative of one or more of total data usage, total downloaded data size and/or total uploaded data size over a given time period (i.e. a day, a week, a month, a quarter year, a half year, or a year).

The data may be updated on the distributed ledger in response to a contract refresh criterion associated with the smart contract. For example, the smart contract may require the data to be updated periodically (daily, weekly, monthly and so forth), in which case, when the specified time period has elapsed, the data is updated. Where a time period is specified in the smart contract, the time period may be associated with a billing cycle set out in the resource service agreement. In other examples, the contract refresh criterion may be associated with one or more of the usage metrics monitored and/or measured for the provisioned resource. For example, for an internet connection, the usage data may be updated when download data size or upload data size passes a threshold value (such as 1 GB, 100 GB, 1 TB, 100 TB and so forth).

At step S170, a settlement request is generated. The settlement request may comprise a payment request, an invoice, a remittance or any other agreed method of settling up for the use of the provisioned resources. In some examples, the inventory management system may be arranged to send and receive fiat payments and/or cryptocurrency payments. The settlement request is generated based on the resource service agreement and the usage of the resource as recorded on the distributed ledger. In the example of a provisioned internet connection, the settlement request may comprise an invoice for the data consumed at the rates agreed in the resource service agreement, or a fixed price agreed in the resource service agreement. The form of the settlement request may be specified in the smart contract (for example who the settlement request is addressed to, the format of the request and so forth). The generated settlement request may then be sent to the user.

It can be seen from this high-level overview that the use of smart contracts enables a wide range of resources to be provisioned to a user. The user's use of the resources can be easily monitored and tracked, and through using a distributed ledger an immutable record of the resource service agreement and the use of the resource can be maintained. This immutable record enables settlement requests to be generated based on actual use of a resource and enables both parties to the transaction to be confident in the veracity of the settlement request. Thus, a flexible "high-trust" inventory management system may be provided. In the following description, it will be explained how this method can be built upon to further improve the method, providing improved resource onboarding, further automation of the generation of the smart contracts, automated dispute management, and two-way automated settlement/remittance.

Overview of Supplying Resources

Figure 2:
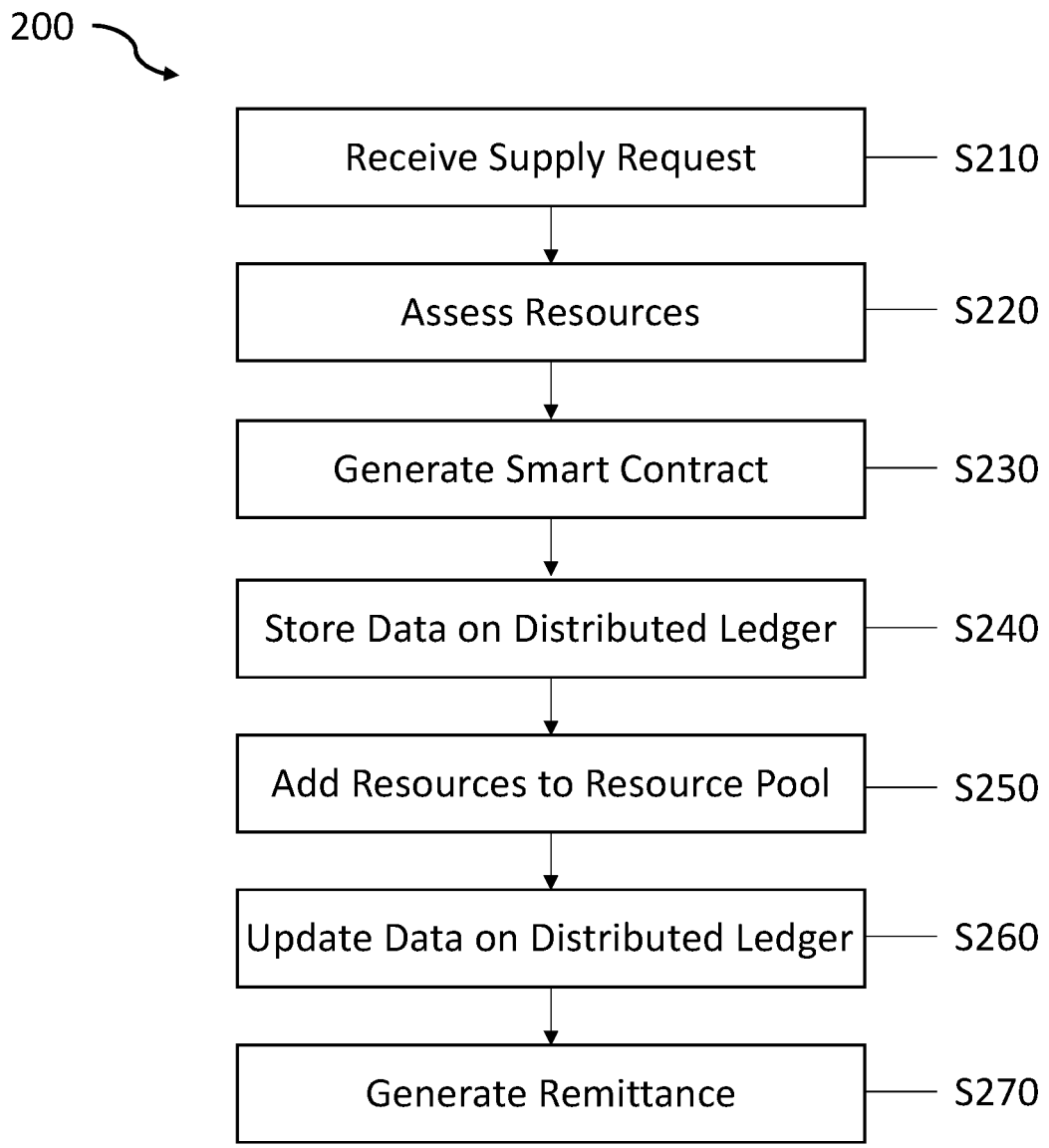
FIG. 2 shows a further inventory management method for use in managing resources.

FIG. 2 provides a high-level overview of an inventory management method which enables onboarding of resources into an inventory management system; the onboarded resources may then be supplied to users in accordance with the methods described herein. As shown in FIG. 2, an inventory management method 200 can begin by receiving a request, from a supplier, to supply one or more resources at step S210.

Alternatively, before a supplier is able to submit a request to supply a resource, the supplier may be required to perform an initial onboarding process, which may comprise subscribing to a supplier access portal providing partial or full access to the inventory management system, verification of the supplier's legal entity (which may comprise checking sanction lists, credit checking and so forth), and acceptance/signing of a service agreement (which may comprise a reselling agreement (defining how a supplier's resources may be re-sold to users), a privacy policy and/or terms of service). In some examples, during or after this onboarding process, the supplier may be provided with a supplier wallet, stored by the supplier, the inventory management system, or both. The supplier wallet may be suitable for storing one or more tokens associated with the resources they wish to supply (which will be described in more detail below). In some examples, during or after the onboarding process, the supplier may also be assigned a port, or ports, on the system's network equipment. The assigned port(s) may allow the supplier to supply services to other participants in the inventory management system over the assigned port(s). The supplier may further be provided or otherwise exposed to the inventory management systems software development kits (SDKs) and APIs in order to be able to "map" their resources to the requirements of the inventory management system.

Returning to step S210, the received request to supply resources may provide details of a resource or resources that a supplier wishes to make available through the inventory management system. In line with the previous example, the resources could be, for example, internet connectivity services. Alternatively, the resources could be cloud computing resources which can supply remote data storage services and/or remote data processing services. For the following description, cloud computing resources will be used to exemplify the method. The received request may also comprise pricing information defining the pricing the supplier wishes their services to be re-sold for. In many cases, the pricing information may comprise a pricing model which defines a number of different prices for different resources and resource service levels.

The received supply request may include all of the data needed to enable later provisioning of the associated resource. For cloud computing resources, the request may comprise port and connection information, available capacity, and so forth. Where further information is needed to enable provisioning of the associated resource, the method may generate and send a request for further information in response to receiving the supply request (not shown). The received supply request may also include information related to the supplier (name, address and so forth) and any other information relevant to supplying a particular resource.

At optional step S220, the resources associated with supply request may be assessed for their suitability for inclusion into the pool of resources. This assessment may be based entirely on the received supply request. Alternatively, the assessment may also be based on further information requested from the supplier and/or based on testing of the offered resources. In some embodiments, this assessment also comprises tokenization of the resource, into a standard token format. In the case of large resources, these may be split up into several portions to enable multiple users to access the same resource. For example, a cloud data storage resource of 100 TB may be divided into smaller portions, more typical of the data storage required by a user: the 100 TB resource may be divided into 100 1 TB portions, which each may be represented by its own token (leading to 100 tokens representing 1 TB of data storage). In other examples where the users are commercial scale users, a single 100 TB token may be appropriate. It is not essential that a given resource is tokenized, each of the methods described herein may be equally applied to non-tokenized resources. However, as will be explained later on, tokenization can provide a convenient way of managing ownership of resources handled by the inventory management system.

At step S230, a smart contract is generated, which defines a contractual agreement setting out terms for use of the supplied resources. In some examples, the smart contract may be based in part on the supplier onboarding process. The contractual agreement may cover terms for including the supplied resources in a pool of available resources and/or terms for the provision of the supplied resource to a user requesting access to the supplied resources. The smart contract may comprise a two-party agreement to supply the requested resource. In other examples, where a resource is provided to a user or multiple users, the smart contract may comprise a multi-party agreement, or multiple smart contracts may be required. For simplicity, a two-party smart contract describing a relationship between a supplier and an operator of the inventory management system will be described in the following.

The smart contract may be generated by any known mechanism. Several example methods of creating the smart contract will be discussed in more detail in latter sections of the description. For now, it is sufficient to understand that a smart contract is generated, and that the smart contract comprises a resource supply agreement (and optionally one or more resource service agreements as described previously). The resource supply agreement sets out the terms for supplying the resource to the pool of resources, and optionally the terms for supplying the resource to a user (where standard supply terms have not been agreed). Thus, the resource supply agreement may comprise a resource identifier, a supplier identifier and a billing agreement (i.e. billing frequency, payment terms and agreed charges for a given resource).

Once the smart contract has been generated, the smart contract may need to be validated by the supplier to signal their agreement to the terms of the resource supply agreement. In this case, the smart contract may be sent to the supplier and no further method steps performed until a validated smart contract is returned. In other examples, the initial supply request may comprise either an explicit or implicit agreement to any provided resource supply agreement, in which case the method may continue without the need for a supplier validation step. In other examples, supplier validation of the smart contract may not be required at all or may be requested after inclusion of the supplied resources in the resource pool.

At step S240, data associated with the generated smart contract is stored on a distributed ledger. The distributed ledger may be, for example, a blockchain suitable for storing smart contracts. The distributed ledger may be implemented on a Ethereum-based blockchain, Ripple-based blockchain, Hyperledger Fabric based blockchain, or any other suitable distributed ledger technology. In some examples, the entirety of the smart contract may be stored on the distributed ledger, in other examples only smart contract identifying information is stored on the distributed ledger with the smart contract being stored on a separate medium.

At step S250 the resources associated with the smart contract are added to the pool of resources. This step may comprises adding a representation of the resources to a pool of resource representations. Alternatively, where the resources have been tokenized, the tokens associated with the supplied resources may be moved from a wallet associated with the supplier to a centralized wallet associated with the inventory management system (or otherwise recreated in the centralized wallet), thereby indicating the availability of the supplied resources. The resources are thus now available to fulfil resource requests in accordance with any of the methods described herein.

Use of the supplied resources may thereafter be measured or otherwise monitored. For example, in the case of cloud computing resources, storage capacity usage, downloaded data size, uploaded data size and/or processing cycles may be continuously or periodically monitored. In other examples, the monitoring may be performed by the supplier who then supplies usage data either periodically or upon request.

At step S260 the data associated with the smart contract is updated, based on usage of the supplied resources. In some examples, the smart contract stored on the blockchain may itself be refreshed or renewed as part of this updating process. In other examples, only part of the data associated with the smart contract may be updated. The updated data is indicative of the usage of the supplied resource and may comprise a summary of usage over a given time period. For example, for cloud computing resources, the updated data may be indicative of one or more of total storage usage, total downloaded data size, total uploaded data size and/or total processing cycles used over a given time period (i.e. a day, a week, a month, a quarter year, a half year, or a year).

The data may be updated on the distributed ledger in response to a contract refresh criterion associated with the smart contract. For example, the smart contract may require the data to be updated periodically (daily, weekly, monthly and so forth), in which case when the specified time period has elapsed, the data is updated. Where a time period is specified in the smart contract, the time period may be associated with a billing cycle set out in the resource supply agreement. In other examples, the contract refresh criterion may be associated with one or more of the usage metrics monitored and/or measured for the supplied resource. For example, for cloud computing services, the usage data may be updated when download data size or upload data size passes a threshold value (such as 1 GB, 100 GB, 1 TB, 100 TB and so forth), when total storage capacity exceeds a threshold value (such as 10%, 20%, 50%, 80% 90% and so forth), and/or when the number of used processing cycles exceeds a threshold value.

At step S270, a remittance is generated. The remittance may comprise an automatic payment, an invoice, or any other agreed method of paying or arranging payment for the use of the supplied resources. In some examples, the inventory management system may be arranged to send and receive fiat payments and/or cryptocurrency payments. The remittance is generated based on the resource supply agreement and the usage of the resource as recorded on the distributed ledger. In the example of a cloud computing services, the remittance may comprise an automatic payment for the data storage capacity used and/or the number or processing cycles used at the rates agreed in the resource supply agreement, or a fixed price agreed in the resource supply agreement. The form of the remittance may be specified in the smart contract (for example where the payment is sent, who it is addressed to, the format of the payment and so forth).

Generation of a payment to a supplier may also trigger or otherwise be associated with the generation of a corresponding remittance request which is to be sent to the user consuming the supplied resource. Any of the methods described herein for generating such a settlement request may be used.

It can be seen from this high-level overview that the use of smart contracts enables a wide range of resources to be imported into the inventory management system and thereafter provisioned to a user. The inventory management system can easily track the resource provided by the supplier and, through using a distributed ledger, an immutable record of the resource supply agreement and the use of the supplied resource can be maintained. This immutable record enables a remittance to be automatically generated for the supplier based on actual use of a resource, which enables both parties to the transaction to be confident in the veracity of the remittance. Thus, a flexible "high-trust" inventory management system may be provided.

Furthermore, tokenization of resources may provide a convenient method of tracking ownership/use of a resource made available by the inventory management system, by using the tokens as representations of the resource. For example, each resource managed by the inventory management system may initially be represented by a token stored in a centralized wallet managed by the inventory management system, or by a token stored in a wallet associated with a supplier of the resource. When a new resource is supplied to the inventory management system, a corresponding token is created. When a resource is provisioned to a user, a corresponding token may be moved from the centralized wallet to a wallet associated with a user, thereby indicating both provisioning, current "use" by the user, and the fact the resource is no longer available to be supplied to a different user. Movement of a token may comprise digitally transferring the associated token, wherein the transfer of the token is recorded on the distributed ledger. Alternatively, instead of moving the token, the token in the centralized walled may be removed, burnt, or otherwise destroyed, with a corresponding token then created or recreated in the user's wallet. In a further example, instead of moving the token, the token in the centralized wallet may be amended to indicate the provisioning of the associated resource. Amending the token may comprise amending one or more token data fields to indicate that the associated resource has been provisioned, to link the token to an identifier associated with the user, to link the token with an identifier associated with the user's wallet. Any token amendments, token movements, or token creation/destruction may be recorded on the distributed ledger associated with the inventory management system.

In some examples, tokens may be used as follows. First, a supplier may initialize the asset they wish to supply to one or more users through the inventory management system. For example, if a supplier wishes to supply 1 TB of data storage space, the supplier (or the inventory management system) may divide and tokenize the 1 TB of storage into 1024 tokens of 1 GB storage or 2048 tokens of 0.5 GB storage, a combination of different storage sizes, or any other division. Following tokenization, the supplier's resource may be made available to users of the inventory management system, in accordance with any of the methods described herein. A user may then, for example, request a set amount of the supplier's storage e.g. 2.5 GB of storage. In response to this request, 2 tokens of 1 GB and 1 token of 0.5 may be selected for provisioning to the user (or 5 tokens of 0.5 GB of storage).

Once the terms of supplying the resource have been agreed with the user and recorded in a smart contract, the supplier or the inventory management system may then move, or recreate, these three tokens to the user's wallet. Signing or recording of a smart contract may directly trigger the associated resources to be assigned to the user, or this may occur at a later time or date. Assigning resources to a user may also cause (or force) the token(s) corresponding to the assigned resources to be moved from a supplier wallet to the user's wallet. In some examples, this resource assignment step may occur without further input from the inventory management system once the smart contract is finalized. In parallel with movement of the tokens one or more tokens in the supplier wallet may be destroyed. For example, where a system has a smallest tokenized denomination of 1 GB of storage and 0.5 GB of storage (or other non-integer amount) is assigned to a user, movement of the tokens may cause a 1 GB token to be destroyed (to avoid a 0.5 GB token being created or partially used 1 GB token being maintained). Destruction of any such token may be recorded, and the destroyed token regenerated when the resources are returned from the user. In some examples, where the tokens do not match the size of the requested resource (i.e. where only 1 GB tokens are available and a user requests a non-integer resource amount), the resource tokens may be assigned that have a greater associated capacity than that requested.

In some examples, management, monitoring and/or control of the resources being supplied to a user may be controlled by the supplier(s) supplying the resources. For example, a supplier may tokenize their own resources, make their resources available through the inventory management system, approve smart contracts defining the supply of their resources, transfer tokens associated with their resources from their supplier wallet to a user wallet, monitor consumption of their resources, and/or contribute to the distributed ledger in accordance with any of the methods described herein. In addition, or as an alternative, some monitoring functions (such as the monitoring of consumption of one or more resources) may be performed by the users. In this manner, functions of the inventory management system may be distributed across the suppliers and/or users, thereby reducing the computational processing and storage requirements of the inventory management system.

When the smart contract associated with the supplied resource(s) expires or is otherwise terminated, the tokens in the user's wallet will be return to, or recreated in, the supplier's wallet or the centralized wallet. Although tokens of "reserved"/"in use" resources are moved between wallets in order to depict commercial relationships, the supplier's wallet and/or the inventory management system may have a "ledger" recording the resources that have been initialized, the resources that are "in use" and the resources that are "reserved" but not currently in use. In many examples, multiple suppliers may be contributing resources to the inventory management system. Generation and use of smart contracts in accordance with the methods described herein, enables monitoring, tracking and management of both wholesale relationships (i.e. Supplier to Supplier) and retail relationships (Supplier to User). In still further examples, multiple suppliers may contribute resources to fulfil a single user request. For example, a user may request a port, a connection and cloud resources from the inventory management system. To fulfil this request, a first supplier may enter into a commercial arrangement with a second supplier to fulfil the resource request. I.e. the first supplier may be able to supply the port and the connection but will need to get the cloud resources from a second supplier (e.g. through a wholesale smart contract). The first supplier may then bundle the cloud resources with its own services to offer it to the user (e.g. through a retail smart contract).

In some examples, tokens representing a resource may be "simple", containing only an indication of which resource they are associated with (i.e. a resource identifier). In other examples, tokens may comprise more information and be considered "smart". Such "smart" tokens may define certain attributes of the resource they are associated with, and/or provide sufficient data to enable a user to access the resource. In such cases, the token itself may enable a user to access a provisioned resource. Consider for example a "smart token" corresponding to an internet connectivity resource. In this example, the smart token may define three categories of data: 1) supplier-side configuration information, 2) connection information, and 3) user-side configuration information. Table 1 below illustrates the information stored in such a "smart token" which may be provided to enable a user to access a particular internet connection resource.

TABLE 1

Smart Token Configuration Information

| Supplier Configuration | Connection Path | User Configuration |
|---|---|---|
| DC ID | Path | DC ID |
| Switch ID | Bandwidth | Switch ID |
| Port ID | EVC ID | NNI ID |
| Speed | | VLAN ID |
| | | Speed |

In table 1, "DC ID" refers to an identifier of the data center providing the internet connection resource. "Switch ID" refers to an identifier of the switch with which the resource is hosted. "Port ID" refers to an identifier of the port assigned for the user. "Speed" refers to the speed of the port that the user is to be provisioned to (i.e. 1 GB, 10 GB, or 100 GB). "Path" refers to the two access points either side of a network which define the path over which data will be sent between supplier and user (i.e. the A-End and B-End of a network). "Bandwidth" refers to the bandwidth of the connection path. "EVC ID" refers to the Ethernet Virtual Connection (EVC), which is the actual path across the network, which among other attributes includes the VLAN ID assigned to the user at the suppliers NNI. "NNI ID" refers to an identifier of the network-to-network (NNI) port assigned to the resource the user is trying to reach. "VLAN ID" refers to an identifier of the Virtual Local Area Network (VLAN) assigned for the user.

In other examples, such configuration information may form part of the smart contract or may be provided separately to the user as part of the provisioning process. For other types of resources, information stored in a "smart token" (or otherwise provided to the user) will differ, depending on the requirements of the particular resource.

Inventory Management System

Figure 3:
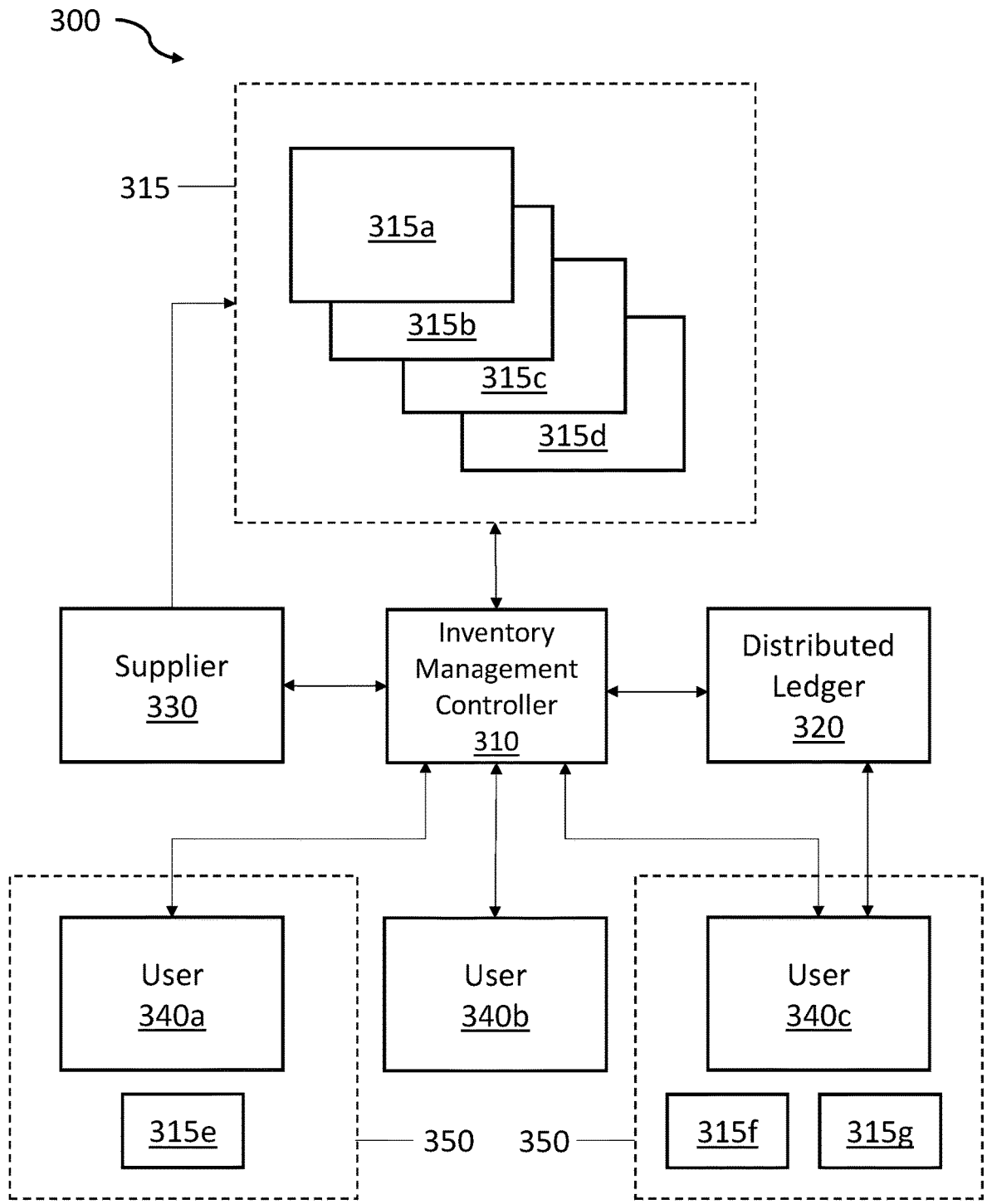
FIG. 3 shows an example inventory management system for use in managing resources.

FIG. 3 provides a high-level overview of an inventory management system 300. Inventory management system 300 comprises an inventory management controller 310, which may be arranged to perform the functions of any of the methods described herein.

The inventory management controller 310 controls a pool of resources 315. In the present example, the pool of resources 315 comprises four resources 315a to 315d. However, in practice, the pool of resources may comprise hundreds of resources, thousands of resources, or more. The inventory management controller may be in data communication with each of the resources in the pool of resources and/or in data communication with one or more suppliers 330 who control the supply of one or more of the resources in the pool of resources. The pool of resources may comprise the actual resources that are available for provisioning to a user, or a representation of each resource. Consider, for example, that resources 315a-d in the pool of resources represent a logistical resource, such as a shipping container or cargo truck. In such examples, the resources 315a-d may be representations of the associated resources, such as a tokenized record of the resource. For example, a cargo truck may be represented in the pool of resources 315 by a token comprising data such as current, past or future location information, truck size, loading time, loading capacity, travelling speed, cost per mile, cost per load, refrigeration capacity, the type of goods that can be carried, and so forth.

The inventory management controller 310 is arranged to add resources into the pool of resources 315 and provision resources from the pool of resources 315, in accordance with any of the methods described herein. The inventory management controller is further arranged to generate, or otherwise receive, smart contracts defining contractual agreements to place resources into the pool of resources 315 and/or receive access to resources in the pool of resources 315.

In addition, inventory management controller 310 may be in data communication with a distributed ledger 320 (either directly or through a distributed ledger manager (not shown)). The distributed ledger may be addressed by the inventory management controller 310 in order to create and proliferate immutable records of the smart contracts it has generated or received.

The inventory management controller 310 is illustrated in this example as being in data communication with three users 340a to 340c. This data communication can be achieved by any known wired or wireless communication technology. In practice, the inventory management controller may be connected to many more users. In FIG. 3, users 340a and 340c are illustrated within dashed boxes 350, which indicate associated resources 315e to 315g. The bounding boxes may be considered to be indicative of "user wallets", which contain tokens associated with resources 315e to 315g. As explained previously, when a resource is provisioned to a user, a tokenized representation may be moved from a central wallet (i.e. pool of resources 315) to a user wallet (i.e. one of wallets 350). In some examples, a particular resource may have multiple associated tokens in the pool of resources. In this case, each time the resource (or part of the resource) is allocated to a user, a token associated with the resource may be moved from the centralized wallet to a user wallet, to represent allocation of the resource to the user. When all tokens associated with a particular resource have been removed from the centralized wallet, the particular resource will no longer be represented in the pool of resources and thus is no longer available to fulfil future resource requests. In some examples, rather than moving a token, a corresponding token may be recreated in the user wallet to represent allocation of the resource to the user; the token in the centralized wallet may then be deleted, marked inactive, marked "in-use" or otherwise amended to indicate that the associated resource has been allocated to a user. In further examples, as will be explained in more detail below, resources may be supplied to a user from a supplier external to the inventory management system, the supplier having a supplier wallet which may also be updated to reflect the allocation of a resource to the user. The updating of the supplier wallet may also comprise a token, or tokens, representing the supplied resource being deleted, marked inactive, marked "in-use" or otherwise amended.

User 340b has no associated resources or "user wallet" which may be indicative of no resources yet being assigned (thus no user wallet needs to have been created), or no resources actively being used by user 340*b* (in which case the user's wallet may have been deleted or otherwise suspended).

Each user 340*a* to 340*c* is in data communication with the inventory management controller 310, and through interacting with the inventory management controller, may be provisioned with one or more resources from the pool of resources 315, in accordance with the methods described herein. Once provisioned, the inventory management controller may monitor usage of a resource (either through direct communication with a resource or through reporting received from the user). The inventory management controller may thereafter record usage of provisioned resources on the distributed ledger.

In some examples, users may directly interact with the distributed ledger 320. This is illustrated in FIG. 3 by a 2-way link between user 340*c* and distributed ledger 320. User 340*c* may be provided with read-only access to the distributed ledger, enabling the user 340*c* to review the data stored in the distributed ledger. The user may have continuous read-only access to the distributed ledger or may receive temporary access in response to the inventory management controller receiving (and verifying) a distributed ledger viewing request, from the user. Any known security verification process may be used to enable access to the distributed ledger. For example, the distributed ledger viewing request may comprise a user identifier and one or more security credentials such as a password. The inventory management controller may then verify the user identifier and password by cross checking the information with a verification database. Additionally, or alternatively, a public-private key pairing, hashed password, two-step verification, captcha or other security process may be implemented. In some examples, secure user data may be held on a private part of the distributed ledger.

Once the distributed ledger viewing request has been verified, the inventory management controller 310 may identify one or more smart contracts stored on the distributed ledger that correspond with the user identifier contained in the request. The user may then be allowed to only view those smart contracts (and any associated data) which correspond with the user identifier. In this way, users are able to view and verify the data held on the distributed ledger which is associated with them, whilst maintaining the privacy of data associated with other users of the system. In other examples, as will be explained in more detail with reference to FIG. 4, users may be provided both read and write access to the distributed ledger. Moreover, users may be able to locally host processing nodes for the distributed ledger, thereby contributing to the proliferation of the distributed ledger.

Overview of Distributed Ledger Processing Network

Figure 4:
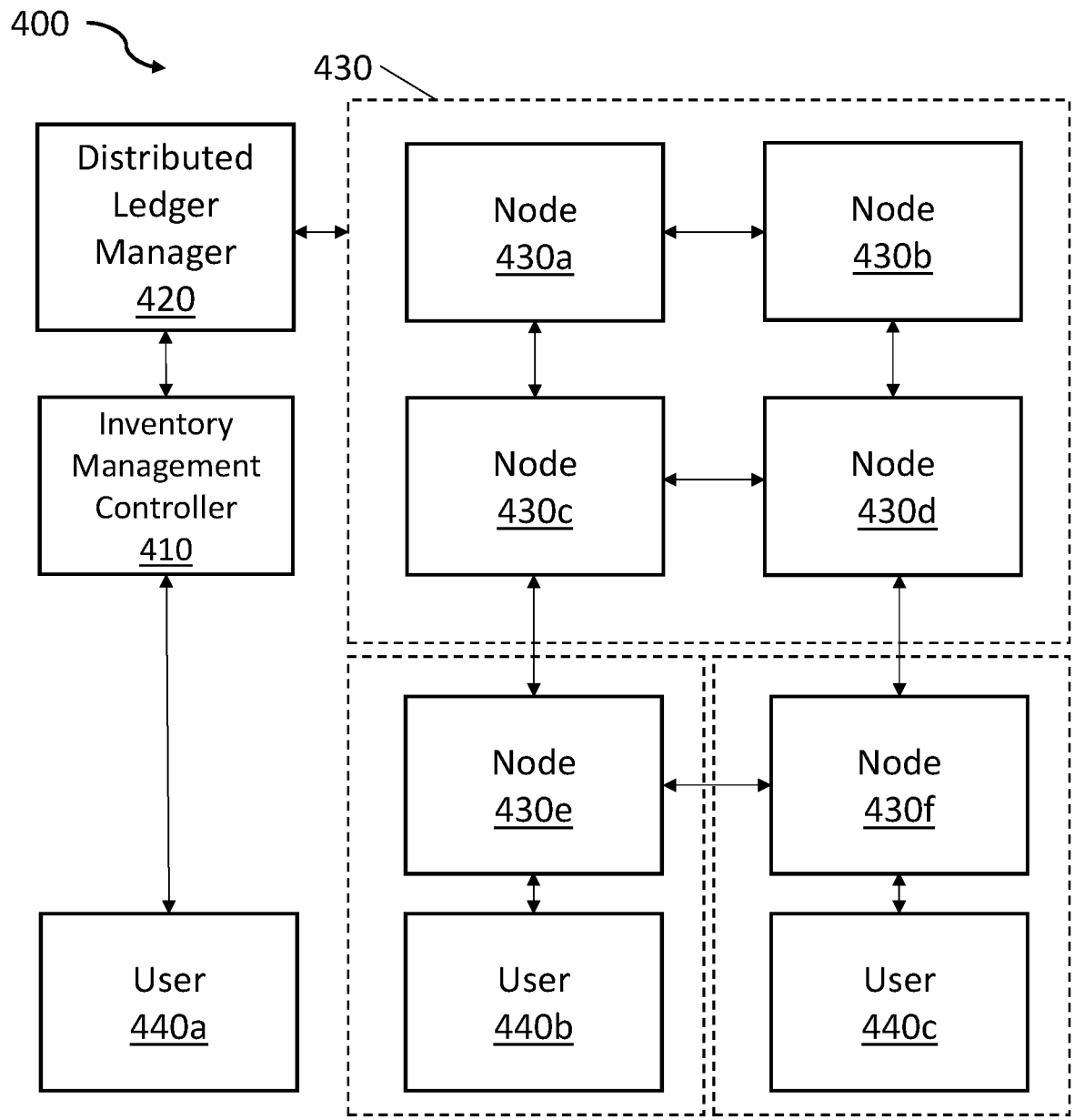
FIG. 4 shows an example distributed ledger processing network for use with the inventory management system.

FIG. 4 provides an overview of a distributed ledger processing network 400 suitable for use in conjunction with an inventory management system. The distributed ledger processing network 400 may be controlled by an inventory management controller 410 directly, as described previously. Alternatively, as shown in FIG. 4, a distributed ledger manager 420 may be introduced, which is arranged to setup and operate the processing nodes of the distributed ledger processing network 400. In some examples, the inventory management controller 410 and the distributed ledger manager 420 may be combined.

In the present example, distributed ledger processing network 400 comprises four centrally managed nodes 430, labelled 430*a* to 430*d* respectively. Whilst four centrally managed processing nodes are shown in FIG. 4, more or less nodes may be used in practice, depending on the technology underlying the distributed network. The presently described systems and methods are agnostic to distributed network technology type. Each centrally managed node 430 may be in data communication with each other centrally managed node, or in data communication with its nearest neighbours (as shown). Each processing node maintains a copy of the distributed ledger and updates the distributed ledger in conjunction with the other processing nodes of the system, in accordance with any known distributed ledger protocol. In this manner, collectively, centrally managed processing nodes 430 form a network of processing nodes which can process and verify all new data being added to the distributed ledger.

The greater the number of processing nodes in the network, the more difficult it is for a "brute-force" attack on the network to succeed (as 51% of the network would be required to succeed in a brute-force attack). However, each additional processing node requires computational and memory resources, increasing the cost of running the distributed ledger processing network. In some examples, the number of centralised processing nodes is selected to consist of the minimum needed to keep the network secure from any reasonably expected attack. The system can also be made more secure and the centralised processing burden can be reduced by introducing remote processing nodes, as described below.

When first setting up distributed ledger processing network 400, it is likely the majority of the processing nodes will be setup and managed centrally by the distributed ledger manager 420. However, in some examples, users are able to contribute to the running of the distributed ledger processing network by hosting their own local processing nodes (otherwise referred to as "remote processing nodes" by virtue of being "remote" from the centralised processing nodes 430).

In FIG. 4, user 440*a* is not hosting a remote processing node. For user 440*a* any interaction with the distributed ledger is handled by communication with the inventory management controller 410, as described previously. There are many reasons why user 440*a* may not host a remote processing node. For example, the user may not be able to handle the burden of hosting a remote processing node, the user may be content to access the network only through the inventory management controller, or the system may not have sufficient trust in the user to authorise the user having a remote processing node.

In FIG. 4, two users 440*b* and 440*c* have been entrusted with their own remote processing nodes 430*e* and 430*f*. In some examples, users wishing to host their own processing node may be required to submit to additional verification steps, such as credit checking, address verification, and the like. Moreover, system security requirements may be placed on users wishing to host their own processing nodes. In other examples, users may be verified through analysis of a history of successful transactions with the system or any other known method of verifying a user. User verification may be performed either by the distributed ledger manager 420 or the inventory management controller 410. In still further examples, the system may have sufficient trust in the user to not require any verification steps.

Users may wish to undertake this verification process and accept the burden of hosting a processing node in order to have a higher level of trust in the data held by the inventory management system, and to implement automated billing based on the distributed ledger, in accordance with any of the methods described herein. Moreover, in some examples, users hosting processing nodes may be rewarded for processing the computations needed to proliferate the distributed ledger. For example, in "proof-of-work" or "proof-of-stake" type distributed ledgers (such as a Blockchain based system), users may receive block rewards (i.e. mining rewards). In other examples, each user hosting a remote processing node may receive a set amount of remuneration based on their contribution to the system.

A user may be verified by the distribution ledger manager in response to receiving a distributed ledger inclusion request from the user, or some other indication that the user is able to host a remote processing node. Once the user is verified (if required), the distributed ledger manager may generate a set of configuration settings for a new processing node. The distributed ledger manager may then send, to the user, the generated configuration settings and a copy of the current distributed ledger, for use by the user to setup a remote distributed ledger processing node. The user may then apply the generated configuration settings to a locally hosted processing node, thereby configuring the locally hosted processing node as a remote distributed ledger processing node.

Remote processing nodes 430e and 430f may be indistinguishable from processing nodes 430a to 430d, apart from being hosted by a user and thus located remotely. In order for remote processing nodes 430e and 430f to contribute to the proliferation of the distributed ledger they must be in data communication with at least one other remote processing node. In other examples, remote processing nodes 430e and 430g may be connected to every other processing node in the system 400, or just neighbouring processing nodes (as shown). Once established, the distributed ledger processing network 400 may be operated in conjunction with any of the methods described herein.

Generation of Smart Contracts

Figure 5:
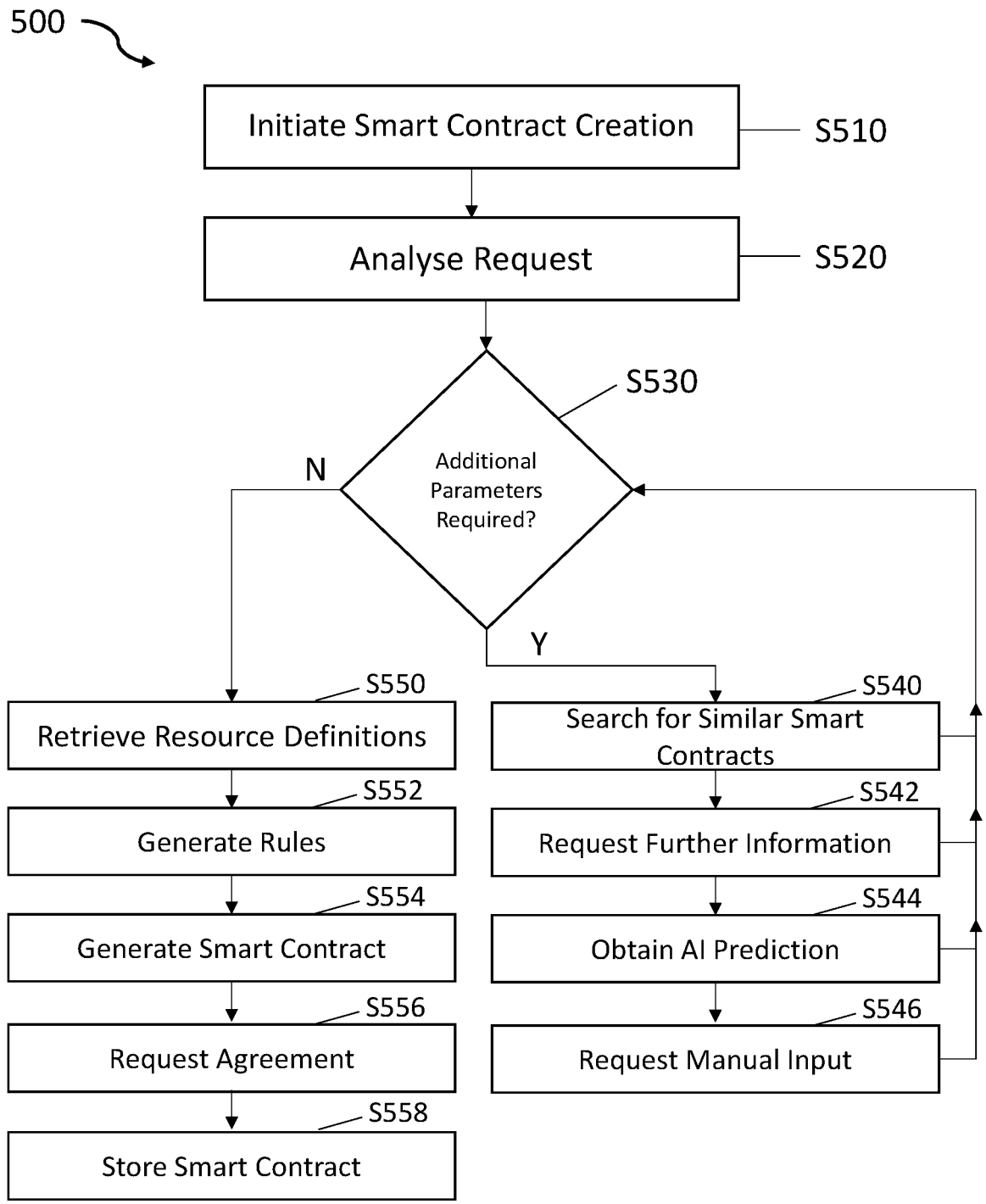
FIG. 5 shows a method suitable for generating smart contracts.

In the methods described herein, one or more smart contracts are generated in order to record contractual agreements to supply or consume resources managed by an inventory management system. FIG. 5 illustrates a method for generating smart contracts which may be used in conjunction with any of the other methods described herein. The methods described in conjunction with FIG. 5 may be applied to smart contracts defining relationships with suppliers wishing to place resources into the pool of resources, as well as smart contracts defining relationships with users seeking access to one or more of the resources of the pool of resources.

Method 500 starts at step S510 with the receipt of a request that requires a smart contract to be created. This request may be a resource request (as described previously), a supply request (as described previously), or any other request indicative of a requirement to generate a new smart contract.

At step S520, the received request is analysed to extract parameters that are suitable for use in the smart contract. For example, where the received request is a resource request, the extracted parameters may comprises one or more of: the name of the requesting user, the address of the requesting user, parameters of the requested resource, a financial offer for the use of the requested resources and so forth. The parameter may be extracted from the received request using any known data extraction technique. In some examples, the analysis step comprises applying an optical character recognition (OCR) process to a received document to extract machine readable text. The received document may be a hand-written or computer-generated resource request form, invoice, or other user document. In other examples, a machine learning algorithm may be applied to extract relevant parameters. In still further examples, the inventory management system may configure, or implement, an application programming interface (API) arranged to receive and process requests in accordance with any of the methods described herein. The API may also be configured to generate and process smart contracts, settlement requests and/or remittances in accordance with any of the methods described herein. Once the request has been analysed and the parameters recognised, the parameters may be sorted, labelled or otherwise interpreted to define which parameters have been extracted from the request.

At step S530, the extracted parameters are reviewed to decide whether sufficient parameters have been extracted to generate a smart contract. This step may comprise comparing the extracted parameters with a set of required parameters that it has been pre-determined are essential to generate a smart contract. For example, it may have been determined that each smart contract requires at least: 1) a user name, 2) a user address, and 3) a requested resource type. In other examples, a more extensive set of required parameters may be required in order to establish a suitable smart contract. However, for simplicity of understanding, the following example will be explained presuming only the three listed parameter types are required.

In the present example, at step S530 it is determined that additional parameters are required. Whilst the analysed request may have contained a user name and a resource request type, in the present example the user address may be missing or incomplete. In this case, the method moves on to one or more of steps S540, S542, S544, or S546 in order to obtain one or more parameters corresponding to the missing parameter from the set of required parameters (the user address). In the following, each of steps S540 to S546 are described as optional. In some examples, only one of the four following steps may be used. In other examples, two, three or four of the steps may be implemented in a smart contract generation method.

At optional step S540, in order to find the missing parameter a distributed ledger comprising previously created smart contracts may be searched in order to identify one or more similar smart contracts. In the present example, the distributed ledger may be searched based on the user name parameter retrieved from the initial request to identify other smart contracts associated with the same user name. If one or more such smart contracts can be identified, then the missing address parameter may be extracted from the smart contract. In some examples, the identified smart contract may also be used to verify any other parameters extracted from the original request.

In addition, or as an alternative, to a name parameter search, the distributed ledger may be searched to identify smart contracts based on the requested resource type parameter. In this case, a unique address parameter may be identified if a particular resource from the pool of resources is only requested by a particular user. In other examples, any parameter, or combination of parameters, extracted from the original request may be used to search the distributed ledger in an effort to identify missing parameters. In other examples, the parameters used to search the distributed ledger are prioritised based on their likelihood of retrieving a unique or a correct result.

Some of the possible search combinations that could be used could return smart contracts with different suggestions for the missing parameter. In this case, the search results may be analysed to produce a "best guess" result, which may be, for example, the most frequent result or the most recent result. It is not essential at this stage that the correct missing parameter is identified, as there may be a later data verification step. In such cases, it is preferable to gather sufficient information to generate a smart contract, in order to be able to generate a contract that can be verified (which is likely to be correct anyway), rather than requiring human intervention at the initial contract creation step.

If there are no or insufficient numbers of similar smart contracts identified at step S540 (or if step S540 is not performed), the method may move on to optional step S542. At step S542, a request for further information may be generated and thereafter sent to the user. In the present example, the request for further information may comprise a request for the missing user address parameter. In other examples, any missing parameter may be requested from the user. Whilst requesting a request for further information may be computationally simpler than some of the alternatives described herein, requesting further information may cause a time delay in the process whilst the user responds. In addition, in some cases, requesting information that is otherwise available from analysis of the distributed ledger may cause user frustration, if they are required to provide information they have provided previously. However, in some cases, requesting further information from the user may be the only way to obtain the missing parameters, or may be a preferred option for other reasons.

In addition, or as an alternative, at step S544 an artificial intelligence engine, trained on a corpus of training data comprising data extracted from the distributed ledger, may be implemented to suggest a "best-guess" for the missing parameter. Any suitable known artificial intelligence algorithm may be used, such as a Naïve Bayes Classifier Algorithm (a Supervised Learning-Classification algorithm). The artificial intelligence algorithm may also have been trained using additional data not forming part of the distributed ledger, but otherwise relevant to the suggestion of parameters for smart contracts. Using an artificial intelligence engine may provide suggested parameters which would not otherwise be derivable from the user request or the data contained within the distributed ledger.

In addition, or as an alternative, at step S546 a request may be generated for manual input from an operator associated with the inventory management system implementing the presently described methods. Generally, a request for manual input would only be required when one or more of the options, S540 to S544 have not been able to identify a suggestion for the missing parameter. In some examples, any manual input received from the operator may be stored in the distributed ledger and/or fed into the training corpus used for the artificial intelligence engine in order to reduce the likelihood of requiring similar manual input in the future.

Whichever step S540-S546, or combination of steps are used, once a suggestion for a missing parameter has been identified, the method may return to step S530, to check if any additional parameters are required to generate a smart contract. If further parameters are required, one or more of steps S540 to S546 may be repeated. Where multiple options for a missing parameter are obtained, these options may be analysed to identify a "best-guess", or multiple options may be presented during a contract validation step, enabling the user to select the correct option.

Once all of the required parameters for a smart contract have been obtained, the method moves on to step S550, where definitions of one or more resources are retrieved. In the present example, this may comprise identifying one or more resources, from a pool of resources, suitable for fulfilling the requirements of the requested resource type parameter. Returning to an earlier example, where the resources relate to internet connectivity services, step S550 may require analysing the pool of resources to determine which available resource most closely matches the requested resource type parameter. This may require, for example, identifying one or more resources which match a request for a 50 MB unlimited data cap internet connection. At step S550, additional information may also be retrieved in relation to the one or more identified resources. This additional information may comprise, for example, who the supplier of the resource is, the cost for the resource per unit of time, extra capabilities of the resource, technical parameters of the resource such as connection port number and port address, geographic location of the connection point and so forth.

At step S552, one or more rules which help define the contractual relationship for supplying or receiving a resource may be defined. These rules may, for example, relate to a minimum service (or a smallest resource) which a user can be provisioned. Moreover, the rules may define breach of contract criteria, i.e. what constitutes a breach of contract and/or what steps will be taken if the smart contract is breached, such as termination or reduction of a supplied resource, cancellation of the smart contract, penalty charges and the like. The rules may define parameters relating to the supply of a particular resource and/or payment for usage of a particular resource. For example, these rules may define the level of service for a given resource, parameters of the supplied resource such as upload speed or download speed, what happens to the smart contract/supply of a resource in the case of non-payment, partial payment, failure in supply of the resource, partial failure of the supply of the resource and so forth. In addition, or as an alternative, these rules may provide one or more discrepancy thresholds which allow for normal operation of the smart contract as long as usage or supply does not vary by more than a threshold amount. For example, for a 50 MB internet connection, a rule could be created that enables the data speed to vary within +/−5 MB. Similarly, if a smart contract agrees a monthly price of $100 for a given resource, a rule could be created that would accept any payment within +/−5% of this amount. Where an internet connection is agreed with a capped 100 GB download limit, a rule could be created that would enable a 10% overage in this download limit before any penalty clause associated with the smart contract is applied. Such thresholds thereby enable more flexible smart contracts which can take into account (for example) variability in the supply of a resource, variability in the accuracy of monitoring consumption of a resource and/or variability exchange rate (which may cause unexpected under/over payment).

The rules generated as step S552 may be pre-defined. For example, every smart contract generated for the supply of a particular resource may automatically have one or more pre-defined rules generated (such as those described above). Alternatively, or in addition, one or more rules may be created (or an existing rule modified) based on analysis of the resource that is to be supplied and/or analysis of the user. For example, where the resource to be supplied to a user is a 50 MB internet connection that is a sub-division of a larger 1 GB internet connection, a rule which would normally allow +/−5 MB in download speeds may be reduced (to +/−1 MB, or 0 MB) to avoid over-consumption of the resource (which could be caused when the whole of the 1 GB internet connection is assigned to different users). In another example, analysis of other smart contracts associated with a particular user may indicate that the user frequently infringes a particular rule in the smart contract (data usage or payment terms). In such a case, additional user-specific rules may be generated (for example requiring additional limits on data usage, or stricter payment terms), or an existing rule may be adjusted to achieve the same effects.

In addition, one or more of the rules generated at step S552 may comprise smart contract refresh parameters, which define when the smart contract should be updated or renewed, when a request for payment for use of an associated resource should be requested (i.e. when a settlement request should be generated) and/or when data associated with the smart contract is updated. For example, rules may be generated which require that usage of the resource(s) associated with the smart contract is recorded every 24 hours, a settlement request should be generated at the end of each calendar month, and that the smart contract should be renewed (and possibly amended) annually.

At step S554, the smart contract may now be generated. The generated smart contract may comprise the parameters extracted from the originally received request, any additional parameters obtained in any of optional steps S540, S542, S544 and/or step S546, a definition of the one or more resources identified at step S550, and any rules generated at step S552. Once generated, optionally at step S556, the smart contract may be sent to the user to request their agreement to the terms of the smart contract. In some examples, this agreement may be restricted to a binary yes or no selection, where if the contract is not agreed to the process may stop. In other examples, if the contract is not agreed to at step S556, the disagreement may be escalated to an operator of the inventory management system, who can decide whether to edit any of the terms of the smart contract and request agreement to the amended smart contract, or to end the process.

Generating the rules at step S554 may further comprise using a machine learning algorithm to predict (or rank) a user reliability, which is indicative of how reliable the client is predicted to be at settling any future payment request (similar to a credit score), and/or complying with any other rule generated at step S554. For example, a Naïve Bayes Classifier Algorithm (Supervised Learning-Classification) may be used to determine a probability that a user is going to raise a false claim (dispute) during settlement, based on supplied user information and any other information recorded in the distributed ledger or otherwise accessible to the inventory management system. The machine learning algorithm and/or the predictions made by the machine learning algorithm may be updated over time, based on observations of the behavior of the user and their use of provisioned resources.

In other examples, the smart contract sent to the user at step S556 may be user-editable, enabling the user to edit one or more of the terms smart contract. This user-editing may be restricted to certain parts of the smart contract, such as user address or supplier preference. In other examples, any term of the smart contract may be edited enabling financial terms, rules and thresholds to be amended. When a smart contract is edited by a user, the edited smart contract may be escalated to an operator of the inventory management system to decide whether or not to agree with the user edits. Alternatively, the edited smart contract may be reviewed by an artificial intelligence engine, or rules-based algorithm, to decide whether the edits are acceptable, based on allowable edits in similar smart contracts stored on the distributed ledger. In some examples, any acceptable edits made by a user may be stored and used to edit the pre-defined rules, or otherwise influence the creation of rules created for future smart contracts.

In some examples, multiple smart contracts may be generated and presented to the user for agreement. For example, where multiple resources in the pool of resources could fulfil a user's request, the user may be presented with several options which may have different suppliers, different costs per unit time for the resource, different geographical locations and so forth. In this manner, the user may be enabled to select (for example), a more expensive resource from their preferred supplier over a cheaper resource from a different supplier. Other user preferences could be handled similarly, enabling a user to select based on, for example, geographic location, maximum upload speed, maximum download speed, and so forth. In other examples, a single "best-fit" smart contract is generated and presented to a user for agreement. In still further examples, request agreement step S556 not be used at all, with the initial resource request considered to be explicit or implicit acceptance of the generated smart contract. In these examples, a "best-fit" smart contract may be used, based on whichever resource from the pool of resources is considered to most closely match the requirements of the original resource request.

Next, at step S558, the smart contract is stored on a distributed ledger. Recording of the smart contract on the distributed ledger may cause the resource(s) associated with the smart contract to be provisioned to the user, either directly from a supplier or by an inventory management controlled as described previously. Alternatively, the resource(s) associated with the smart contract may have been provisioned in response to the user accepting the terms of the smart contract at step S556, or at any previous step. In other examples, the resource(s) associated with the smart contract may not be provisioned until one or more future conditions are met. For example, the smart contract may comprise a pre-payment rule which prevents provisioning of a resource until payment for usage of a resource is received.

In conjunction with storing the smart contract at step S558, in some examples, a user wallet, supplier wallet and/or centralized wallet may be updated to indicate the allocation of the resource(s) associated with the smart contract to the user. For example, a token associated with the allocated resource(s) may be moved from a supplier or centralized wallet to the user's wallet to represent the resource(s) being allocated. In some examples, rather than moving a token, the token associated with the allocated resource(s) may be modified to indicate allocation of the resource(s). In other examples, a new token (or tokens) may be created in the user's wallet which is indicative of the resource(s) now allocated to the user, and any corresponding tokens in the supplier or centralized wallet updated or deleted to reflect the allocation of the resource(s).

Operation of the Inventory Management System—User Settlement Requests

Figure 6:
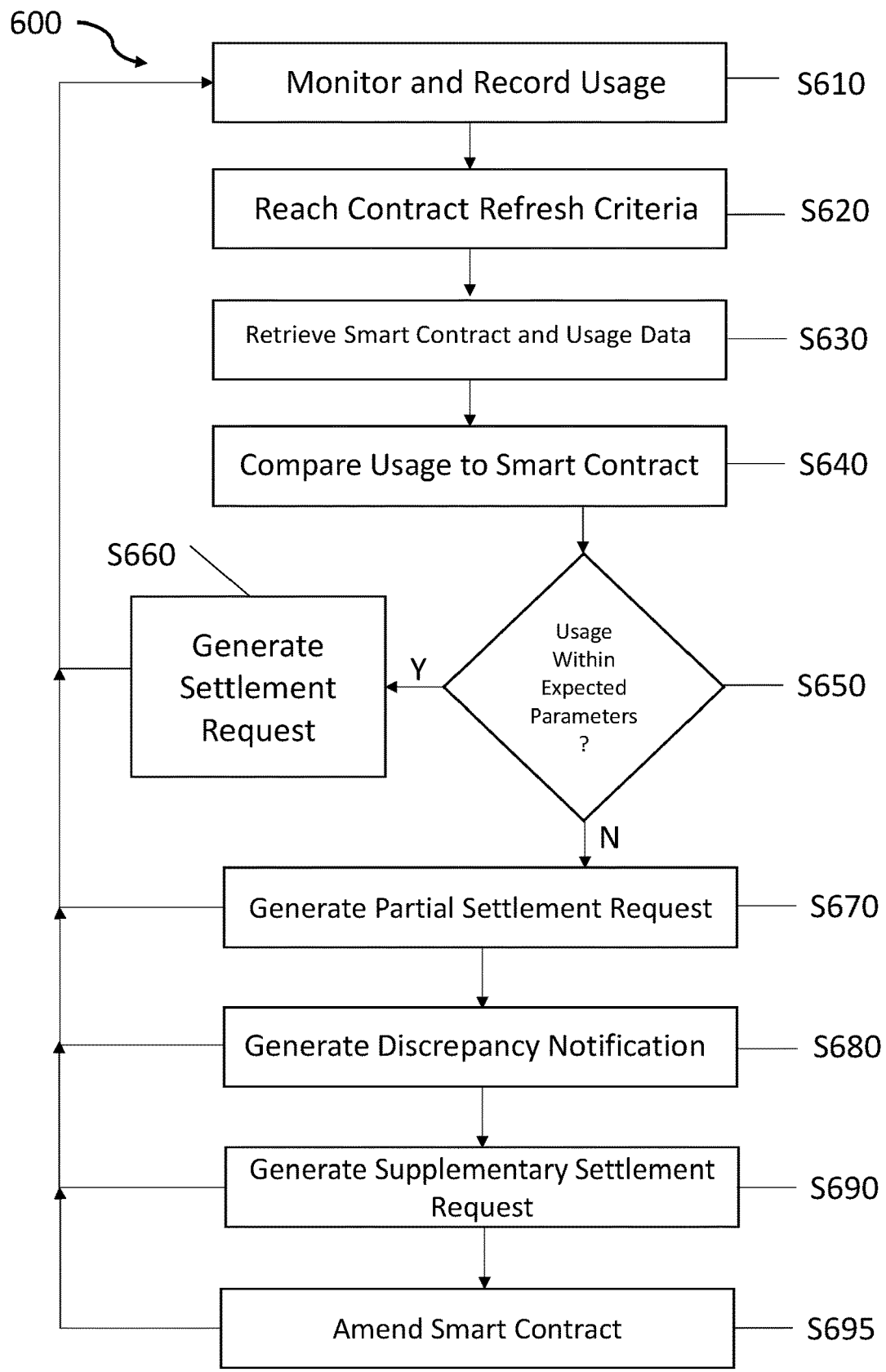
FIG. 6 shows a method suitable for generating settlement requests.

FIG. 6 illustrates a further method of operating the inventory management system, in order to monitor usage of provisioned resources and automatically generate settlement requests for the usage. At step S610, the use of one or more resources being used by a user is monitored. Periodically, the usage of one or more resources is recorded. The method of monitoring and the frequency of recording may be set by one or more rules present in a smart contract associated with the one or more resource, as described previously. For the following description, internet connectivity services will again be used as an example. Consider, for example, a 50 MB internet connection with a 100 GB monthly usage cap being provided to the user. The smart contract associated with this internet connection may comprises rules requiring download data size to be monitored (i.e. the amount of data downloaded using the internet connection), with usage being recorded daily (i.e. each day, the total downloaded data size is recorded). This information may be recorded in association with the smart contract stored on the distributed ledger. In this manner, both the user and the operator of the inventory management system has access to an immutable record of day by day usage of the supplied internet connection.

At step S620, one or more contract refresh criterion is reached which triggers Step S630 to be performed. The contract refresh criterion may be, for example, the reaching of a billing date specified in the smart contract (i.e. when monthly billing is specified, when the date reaches the end of a calendar month). Alternatively, the contract refresh criterion may be related to the recorded usage (i.e. generate a payment request once the 100 GB usage cap has been reached).

At step S630, the smart contract may be retrieved or otherwise analyzed in order to extract the parameters necessary for generating a settlement request. These parameters may include, for example, user identifiers, address identifiers, agreed charge rates for a particular resource and so forth. In addition, at step S630 usage data associated with the resource associated with the smart contract is retrieved, to enable comparison of recorded usage to the terms of the smart contract at step S640.

Based on the comparison at step S640, a decision is made at step S650. If the recorded usage of a particular resource matches the usage parameters defined in the smart contract (which may have been modified by one or more rules defining threshold deviations from agreed usage parameters) the method moves to step S660.

At step S660, a settlement request is generated (and thereafter sent to the user). The settlement request may be generated based on parameters defined in the smart contract (which could for example define who an invoice should be addressed to, where the invoice should be sent, and how much the invoice should be for). Once the settlement request is generated and sent to the user, the method may return to step S610, where the method repeats. In some examples, the method may require confirmation that the user has paid the settlement request within a time frame defined in the resource supply agreement, wherein if no confirmation is received, use of the one or more resources may be restricted or stopped.

Returning to step S650, if the recorded usage does not match the usage parameters defined in the smart contract, the method may proceed in a different manner. In some examples, usage may exceed the usage parameters defined in the smart contract. For example, a user may have used more than their agreed data allowance in an internet connection example. Similarly, a user may have exceeded their agreed data storage allowance or agreed data processing allowance in a cloud computing example. In such cases, it is helpful to identify overuse of a resource to enable the overuse to be charged for and/or to enable the associated smart contract to be adjusted to better reflect the user's requirement.

In other examples, usage may be lower than the agreed usage parameters. For example, the user may have used less of the resource than they originally anticipated or stopped using the resource entirely. In such cases, it is helpful to identify underuse of a resource as it enables consistently underused resources to be reassigned to other users, it enables smart contracts relating to services no longer being used to be finalized and disposed of. In some examples, identifying underuse of a resource may also enable users to only be charged for actual use of a resource, which may be beneficial in comparison to being charged a flat fee for a resource.

Having identified at step S650, that the recorded usage does not match the usage parameters defined in the smart contract, the method may proceed to step S670 where a partial settlement request may be generated and thereafter sent to the user. The partial settlement request may be generated in the same manner as the settlement request of step S660, i.e. based on parameters defined in the smart contract (which could for example define who an invoice should be addressed to, where the invoice should be sent, and how much the invoice should be for). However, the partial settlement request may be restricted to only cover the recorded usage (where usage is less than lower than the agreed usage parameters). In other examples, the partial settlement request may be capped at a level agreed in the smart contract (where usage is higher than the agreed usage parameters).

At step S680, a discrepancy notification may be generated which alerts an operator, or another element of the inventory management system, to the discrepancy between the recorded usage and the expected usage as defined in the smart contract. The discrepancy notification may comprise the smart contract and the associated recorded usage, and it may be represented graphically in a user interface visible to an operator of the inventory management system.

At optional step S690, a supplementary settlement request may be generated to cover any additional resource usage not covered by the partial settlement request. The supplementary settlement request may be generated in response to an input from an operator of the inventory management system. Alternatively, the supplementary settlement request may be generated automatically based on an analysis of the discrepancy notification. In some examples, further data may be analyzed to decide whether or not to generate a supplementary settlement request, such as prior resource usage data, payment history data, usage trend data, global resource usage data and so forth (each of which may be retrieved or otherwise derived from the distributed ledger). In still further examples, it may be decided, either by an operator or automatically, that a supplementary settlement request is not warranted.

At optional step S695, the it may be recognized that one or more terms of the smart contract may need to be amended, or the smart contract terminated, in response to the unexpected resource usage detected previously, in an effort to avoid future unexpected usage. For example, where a user is found to have overused a resource (either once or repeatedly), the terms of the smart contract may need to be amended to assign a different resource, add an additional resource, change an expected usage parameter, change a cost per unit time for a particular resource and so forth. In some examples, access to the resource may be restricted or removed in response to unexpected resource usage. Similarly, when a user is found to have underused a resource, the terms of the smart contract may be amended to assign a different resource (more suitable to the user's requirements), remove access to one or more resources, change an expected usage parameter, change a cost per unit time for a particular resource and so forth.

However, as smart contracts are generally immutable, to amend the terms of the smart contract, a new smart contract may need to be generated to replace the original smart contract. This new smart contract may be generated by any of the methods described herein. The terms of the new smart contract may be modified manually by an operator, or automatically using a rules-based algorithm or an artificial intelligence engine. Any amendments made to terms of the smart contract may need to be approved by the user, who may be sent a copy of the new smart contract for approval. In other examples, the terms of the smart contract may be modified without requiring such approval before the new smart contract is generated. Once modified, the new smart contract may be stored on the distributed ledger. In some examples, the original smart contract may then be marked as "terminated" on the distributed ledger.

After any of steps S670, S680, S690, S695, the unexpected usage of resources may be considered to be sufficiently resolved, and the method may return to step S610, where the method repeats. In some examples, the method may require confirmation that the user has paid the settlement request, partial settlement request and/or supplementary settlement request within a time frame defined in the resource supply agreement, wherein if no confirmation is received, use of the one or more resources may be restricted or stopped.

Advantageously, the presently described method enables usage of resources to be monitored and users of the resources to be flexibly and accurately billed for their usage of the resources. The use of smart contracts enables resources to be dynamically allocated, adjusted and removed, based on the actual consumption of the resources, thereby improving the overall utilization of the available resources. The use of a distributed ledger to immutably record resource usage data enables a user to have increased trust in the system, enabling in many cases automated billing. Furthermore, the level of required human interaction is reduced, as in many cases, available resources can be imported into the inventory management system, offered to a user, provisioned to the user, the use of the resource tracked, recorded and then billed for, all without any human interaction. Moreover, the inventory management system may also be sufficiently flexible to adjust resource allocations and adapt to changing resource usage, still without requiring any human interaction.

Operation of the Inventory Management System—Supplier Remittances

Figure 7:
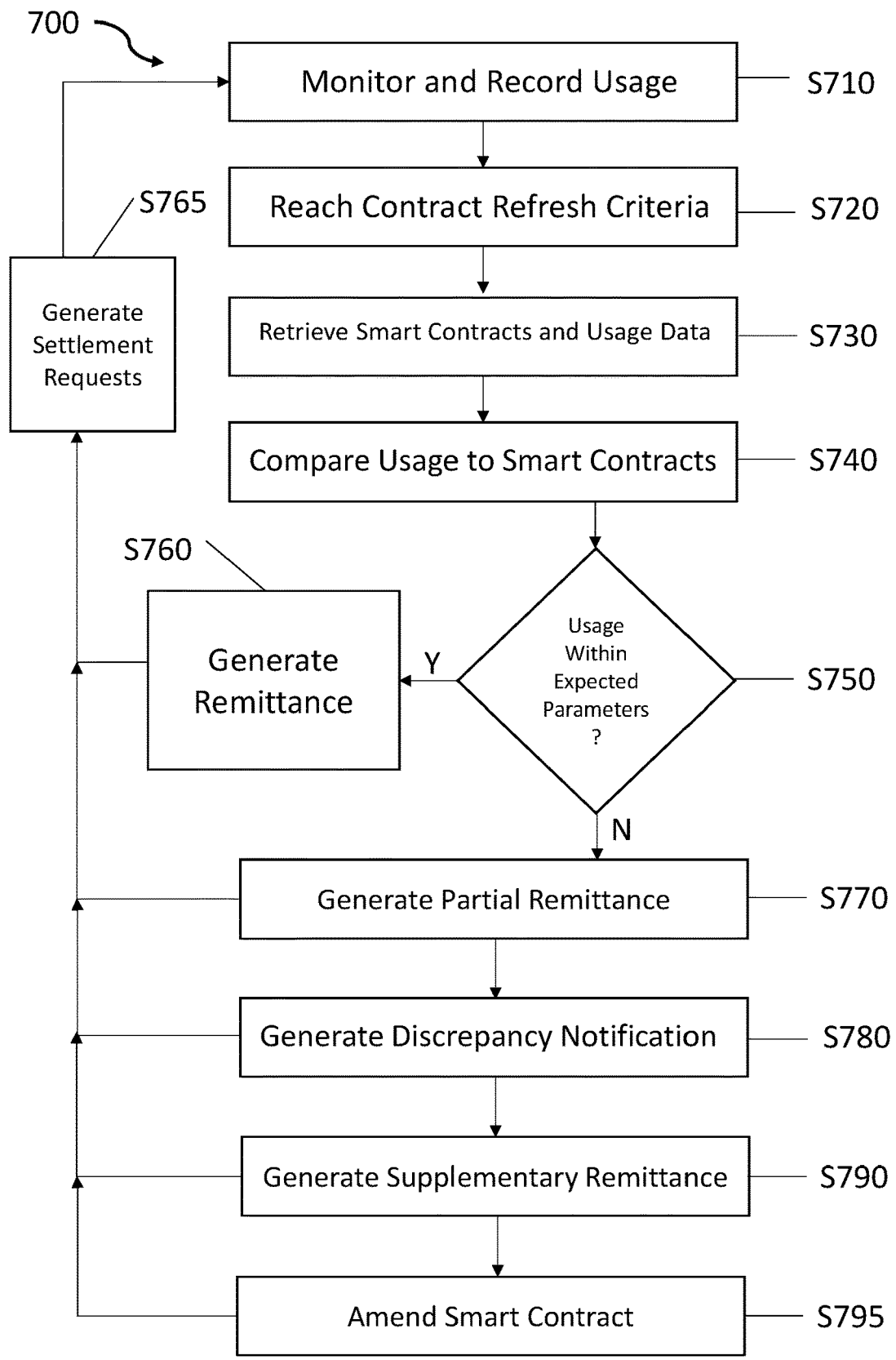
FIG. 7 shows a method suitable for generating remittances.

FIG. 7 illustrates a further method of operating the inventory management system, which may be used to monitor usage of provisioned resources supplied by third party suppliers and to generate remittances for the usage. At step S710, the use of one or more resources supplied by a supplier is monitored. Monitoring may comprise active monitoring by an inventory management controller and/or based on reporting received from the supplier. In conjunction with the monitoring, periodically, the usage of one or more resources is recorded. The method of monitoring and the frequency of recording usage may be set by one or more rules present in a smart contract associated with the one or more resource, as described previously. For the following description, cloud computing services will be used as an example. Consider, for example, a supplier wishing to provide access to a data center capable of storing 100 TB of data. A single smart contract may be associated with this data storage capability which may comprises rules defining the minimum data allowance that a user may take (i.e. users must request at least 100 GB of space to avoid too many subdivisions of the resource), how use of the data storage is to be monitored (i.e. regular reports from the supplier summarizing current storage use, or monitoring of network traffic by a inventory management controller or some entity), with usage being recorded weekly (i.e. at the end of each week, stored data size is recorded). This usage information may then be recorded in association with the smart contract associated with the supplier that is stored on the distributed ledger (in addition the usage information may also be stored in conjunction with one or more smart contracts associated with users of the resource). In this manner, both the supplier and the operator of the inventory management system has access to an immutable record of usage of the data center.

At step S720, one or more contract refresh criterion is reached which triggers the following steps to be performed. The contract refresh criterion may be, for example, the reaching of a billing date specified in the smart contract (i.e. when monthly billing is specified, when the date reaches the end of a calendar month). Alternatively, the contract refresh criterion may be related to the recorded usage (i.e. generate a payment request once a predetermined storage capacity has been used, such as 1, 10, 20 or 50 TB).

At step S730, the supplier's smart contract may be retrieved or otherwise analyzed in order to extract the parameters necessary to generate a settlement for the use of the supplied resources. These parameters may include, for example, supplier identifiers, address identifiers, agreed charge rates for a particular resource and so forth. In addition, at step S730 usage data associated with the resource(s) associated with the smart contract is retrieved, to enable comparison of recorded usage to the terms of the smart contract. In addition, where one or more users will be recharged for some or all of the usage of the supplied resources, smart contracts associated with these users and any accompanying usage data may also be retrieved from the distributed ledger. In still further examples, a single multi-party smart contract may be associated with the resource, storing both user and supplier data.

Having retrieved usage and smart contract data, at step S740 the data is compared to determine whether the recorded usage of the resource (as recorded in the distributed ledger) matches the expected usage of the resource (as specified in the retrieved smart contract(s)). Based on the comparison at step S740, a decision is made at step S750. If the recorded usage of a particular resource matches the usage parameters defined in the smart contract(s) (which may have been modified by one or more rules defining threshold deviations from agreed usage parameters) the method moves to step S760.

At step S760, a remittance is generated which may comprise a payment instruction, an invoice or other financial instrument suitable for paying or instructing payment for use of the resource. In some examples, the inventory management system may automatically fulfil the remittance, thereby paying the supplier for the use of the supplied resources. In other examples, manual or automatic cross checking of the remittance may be required before the remittance is paid. In still further examples, the remittance may not be fulfilled until users making use of the resource have fulfilled related settlement requests. The remittance may be generated based on parameters defined in the smart contract (which could for example define who should be paid, where money should be sent, and how much money should be paid). Once the remittance is generated and fulfilled, the method may return directly to step S710, where the method repeats. Alternatively, the method may move on to optional step S765.

At step S765 one or more settlement requests may be generated, suitable for recharging the remittance to the one or more users making use of the supplied resource. The settlement requests may be generated in accordance with any of the methods described herein, for example, a method in accordance with FIG. 5. Following the generation of any settlement requests, the method may return to step S710, where the method repeats.

Returning to step S750, if the recorded usage does not match the usage parameters defined in the supplier's smart contract, the method may proceed in a different manner. In some examples, usage may exceed the usage parameters defined in the smart contract. For example, the supplied resource may have been overused by a group of users (requiring the supplier to adjust the size of the resource that is supplied), and/or one or more users from a group of users may have used more than their agreed storage allowance (which also may cause the supplier resource balancing issues). In such cases, it is helpful to identify overuse of a resource to enable the overuse to be charged for and/or to enable associated smart contract(s) to be adjusted to better utilize the supplied resource and/or adjust the suppliers resource contribution.

In other examples, usage may be lower than the agreed usage parameters. For example, a supplier wishing to optimize use of their data center may wish to reduce the amount of resource they supply to the inventory management system if there is insufficient use of the supplied resource. Alternatively, the supplier may find knowledge of underuse of their supplied resource useful in setting costs for using their resource. In such cases, it is helpful to identify underuse of a resource as it enables consistently underused resources to be reassigned to other users or reduced in capacity, it enables smart contracts relating to services no longer being used to be finalized and disposed of, and it enables renegotiation of the parameters of the smart contract to better reflect demand for a given resource. In some examples, identifying underuse of a resource may also enable suppliers to only be paid by an operator of the inventory management system for actual use of a resource, which may be beneficial in comparison to paying a flat fee for the supply of a resource.

Having identified at step S750, that the recorded usage does not match the usage parameters defined in the smart contract, the method may proceed to step S770 where a partial remittance may be generated and thereafter fulfilled as described previously. The partial remittance may be generated in the same manner as the remittance of step S760, i.e. based on parameters defined in the smart contract. However, the partial remittance may be restricted to only cover the recorded usage (where usage is less than lower than the agreed usage parameters). In other examples, the partial remittance may be capped at a level agreed in the smart contract (where usage is higher than the agreed usage parameters).

At step S780, a discrepancy notification may be generated which alerts an operator, and/or another element of the inventory management system, and/or the supplier to the discrepancy between the recorded usage and the expected usage as defined in the smart contract. The discrepancy notification may comprise the smart contract (or smart contracts) associated with supply of the resource and any associated recorded usage. The discrepancy notification may be represented graphically in a user interface visible to an operator of the inventory management system, to one or more users, or to the supplier.

At optional step S790, a supplementary remittance may be generated to cover any additional resource usage not covered by the partial remittance. The supplementary remittance may be generated in response to an input from an operator of the inventory management system. Alternatively, the supplementary remittance may be generated automatically based on an analysis of the discrepancy notification. In some examples, further data may be analyzed to decide whether or not to generate a supplementary remittance, such as prior resource usage data, payment history data, usage trend data, global resource usage data and so forth (each of which may be retrieved or otherwise derived from the distributed ledger). In still further examples, it may be decided, either by an operator or automatically, that a supplementary remittance is not warranted.

At optional step S795, one or more of the smart contracts associated with the supplied resource may be amended in response to the unexpected resource usage detected previously, in an effort to avoid future unexpected usage. For example, where a user is found to have overused a resource (either once or repeatedly), the user's smart contract may be amended to assign them a different resource, change an expected usage parameter, change a cost per unit time for a particular resource and so forth. Similarly, the supplier's smart contract may be adjusted to change the amount of resource supplied to the inventory management system, a cost per unit of the supplied resource, or any other parameter recorded in the smart contract. The smart contracts may be modified manually by an operator or the supplier, or automatically using a rules-based algorithm or an artificial intelligence engine. Any amendments made to the smart contract may need to be approved by a user, a supplier, and/or an operator of the inventory management system, each of whom may be sent a copy of any amended smart contract for approval. In other examples, the smart contract may be modified without requiring such approval. Once modified, the modified smart contract may be stored on the distributed ledger, or the original smart contract modified on the distributed ledger to reflect the modifications made.

After any of steps S770, S780, S790, S795, the unexpected usage of resources may be considered to be sufficiently resolved, and the method may return directly to step S710, where the method repeats. Alternatively, as set out above, before returning to step S710 one or more settlement requests may be generated at step S765.

Advantageously, the presently described method enables third party suppliers to supply resources to users of the inventory management system. The supplied resources can be monitored, enabling the supplier to be paid and users of the resources to be flexibly and accurately billed for their usage of the resources. The use of smart contracts enables resources to be dynamically allocated, adjusted and removed, based on the actual consumption of the resources, thereby improving the overall utilization of the supplied resources. The use of a distributed ledger to immutably record resource usage data enables both suppliers and users to have increased trust in the system, enabling in many cases automated billing. Furthermore, the level of required human interaction is reduced, as in many cases, available resources can be imported into the inventory management system, offered to a user, provisioned to the user, the use of the resource tracked, recorded and then billed for, all without any human interaction. Moreover, the inventory management system may also be sufficiently flexible to adjust resource allocations and adapt to changing resource usage, still without requiring any human interaction.

Distributed Ledger Data Analysis

It has been recognized that the distributed ledger contains significant amounts of useful data which may be used to provide useful insights into the use of the resources managed by the inventory management system. Consequently, in some examples, the inventory management system may be further arranged to analyze the data stored on the distributed ledger continuously, or periodically, or in response to a request by a supplier, operator or user of the system.

The data may be analyzed by any known statistical techniques or models and analyzed on a resource by resource basis, to generate resource usage statistics which provide insights for each resource. Any known forecasting model may be used to enable supply/demand forecasting. For a particular resource, recorded usage of the resource may be analyzed to identify trends in usage, gaps in usage, usage outliers. Predictive AutoRegressive Integrated Moving Average (ARIMA) or Monte Carlo based models may be implemented in order to analyze data to provide insight into the use of resources and enable future use of resources to be predicted.

This analyzed data may be used to generate a graphical representation of the usage of the resource over time. The graphical representation may be configured to highlight any deviations from expected usage of a resource. For example, highlighting under or overuse of a resource. Moreover, based on the analysis of the recorded usage data, one or more alerts may be generated and sent to a user, supplier, or operator of the system to highlight unexpected use of a resource. Furthermore, the analyzed data may be used to determine if the operator of the inventory management system needs to expand their network resources, based on an assessment of a) existing usage, b) growth of usage over time), c) interest from new users, and/or d) growth of users in a particular location or geographic region.

In some examples, the inventory management system may use an artificial intelligence engine, or an otherwise rules-based algorithm, to suggest actions to implement in response to the analysis of a particular resource. For example, if a resource is being consistently under-utilized, alternative more suitable resources within the pool of resources may be identified, and the system may suggest switching to the alternative resource to either the operator, supplier or user, to optimize the use of the available resources. This suggestion may be presented in a graphical user interface. Moreover, a new or modified smart contract may be automatically generated and presented as part of the suggestion to switch resources. Similarly, if a resource is being overused, or if a user is consistently breaking one or more of the smart contract's parameters, alternative resources and/or smart contract modifications may be identified and suggested to the user, operator or supplier.

The data on the distributed ledger may also be collectively analyzed to generate resource usage data which provides collective insights into the resources managed by the inventory management system. For example, a plurality of resources, a particular category of resource, or all resources having usage data recorded on the distributed ledger may be analyzed. Analyzing the data for all resources, or a group of resources, may provide insights into the most popular resource types, when and where different resources are being consumed, whether any particular resources are being under or over used and so forth.

In some examples, the inventory management system may use an artificial intelligence engine, or an otherwise rules-based algorithm, to suggest actions to implement in response to the collective analysis of resources being managed. For example, if a group or type of resource is being consistently under-utilized, alternative more suitable resources within the pool of resources may be identified, and the system may suggest switching to the alternative resource to either the operator, supplier or user, to optimize the use of the available resources. Moreover, new or modified smart contracts may be automatically generated and presented as part of the suggestion to switch resources. Similarly, if resources or types of resources are being overused, or if a user or group of users is consistently breaking one or more of the smart contract's parameters, alternative resources and/or smart contract modifications may be identified and suggested to the user(s), operator or supplier. In other examples, suggestions to increase or decrease the availability of a type of resource may be generated and sent to operators or suppliers, if certain resource types are popular, unpopular, over-subscribed or undersubscribed accordingly.

The analyzed data (both individually and collectively analyzed) and/or the identified trends may be stored by the inventory management system for further use. This stored information may be fed into the methods for creating new smart contracts described herein. This information may be used to help suggest the most suitable resources from the pool of resources to provision a particular request and help dynamically manage allocation of the managed resources. For example, a resource type which is known to be under-utilized may be prioritized for provisioning in response to future resource requests, due to being highly available. Alternatively, the underutilized resource may be de-prioritized for provisioning if it is considered to be less preferred by users, thereby improving user satisfaction with the resources they are provided. In further examples, collective utilization of a resource may influence the rules written into future smart contracts, placing a premium on highly used resources and reducing the cost of resources with low utilization. In this manner, over time, resources available to be provisioned may be better utilized.

Inter-Network Communication

In some cases, users and/or suppliers may be operating computing devices (or computing networks) which are not able to directly communicate with the inventory management system. In such examples, the inventory management system may employ one or more application programming interfaces (APIs) to convert incoming and outgoing network traffic to enable the inventory management system and the user/supplier to seamlessly communicate.

To determine suitable functions for such an API, the inventory management system may first analyze incoming network traffic to determine a data format of an incoming communication (such as resource request or an offer to supply a resource). Having determined the incoming data format, the inventory management system may then identify functions that are suitable for converting the incoming data format into a data format used by the inventory management system. An API configured with the relevant functions may be stored locally in a memory of the inventory management system or may be retrieved from a third-party provider when necessary.

Once a suitable API has been configured, the inventory management system may thereafter convert all incoming and outgoing network traffic using the API, so that both the inventory management system and the user/supplier can communicate seamlessly.

In still further examples, a user or a supplier may operate their own internal distributed ledger. When such internal distributed ledgers are not based on a compatible protocol with the inventory management system's distributed ledger, the inventory management system may identify (and implement) functions or drivers suitable for converting between the two protocol types. For example, the inventory management system may identify and implement an instructions toolkit that is capable of converting between the two distributed ledger protocol types, such as a plug-in DAML driver. Other interoperability solutions that help to facilitate communication between two different distributed ledger protocols (two different networks) may be used. These interoperability solutions are often implemented as an abstraction layer, which enables communication between two different protocols. Examples of interoperability solutions suitable for used with the presently described examples include Chainlink (RTM), Harmony (RTM) and Cross-Chain Bridge (RTM).

In this manner, all of the above described advantages can be provided to users and/or suppliers operating systems with differing data formats, thereby reducing the barriers to using the inventory management system and expanding the pool of possible users and suppliers. Furthermore, differing distributed ledger technologies can be made to communicate with the inventory management system further reducing the barriers to make use of the system.

Example Computing Device

In one or more embodiments, the methods described herein for managing inventory can be implemented on a computing device. Examples of internal components of a computing device 800 for use with the methods described herein is provided with reference to FIG. 8. The computing device 800 may include storage 802 which may include one or more volatile memory, such as a Random Access Memory (RAM) and non-volatile memory, such as Read Only Memory (ROM) or a solid state drive (SSD) such as Flash memory. The storage 802 may include other storage devices, such as, for example, magnetic or optical, and may be in a format such as compact disc (CD), digital versatile disc (DVD) or other storage media. The storage 802 may be removable, such as SD or USB type drives or non-removable from the computing device 800.

The computing device 800 may include at least one processor 804 that is communicatively coupled to the storage 802. The at least one processor 804 in the example of FIG. 8 may include a microprocessor, a general-purpose processor, an application specific integrated circuit (ASIC), a digital signal processor (DSP), a field programmable gate array (FPGA) or other programmable logic device, discrete hardware components, a discrete gate or transistor logic, or any suitable combination thereof capable of performing the functions described herein. A processor may also be implemented as a combination of computing devices, such as, for example, a plurality of processors, a combination of a DSP and a microprocessor, one or more microprocessors in conjunction with a DSP core, or other such configuration.

Figure 8:
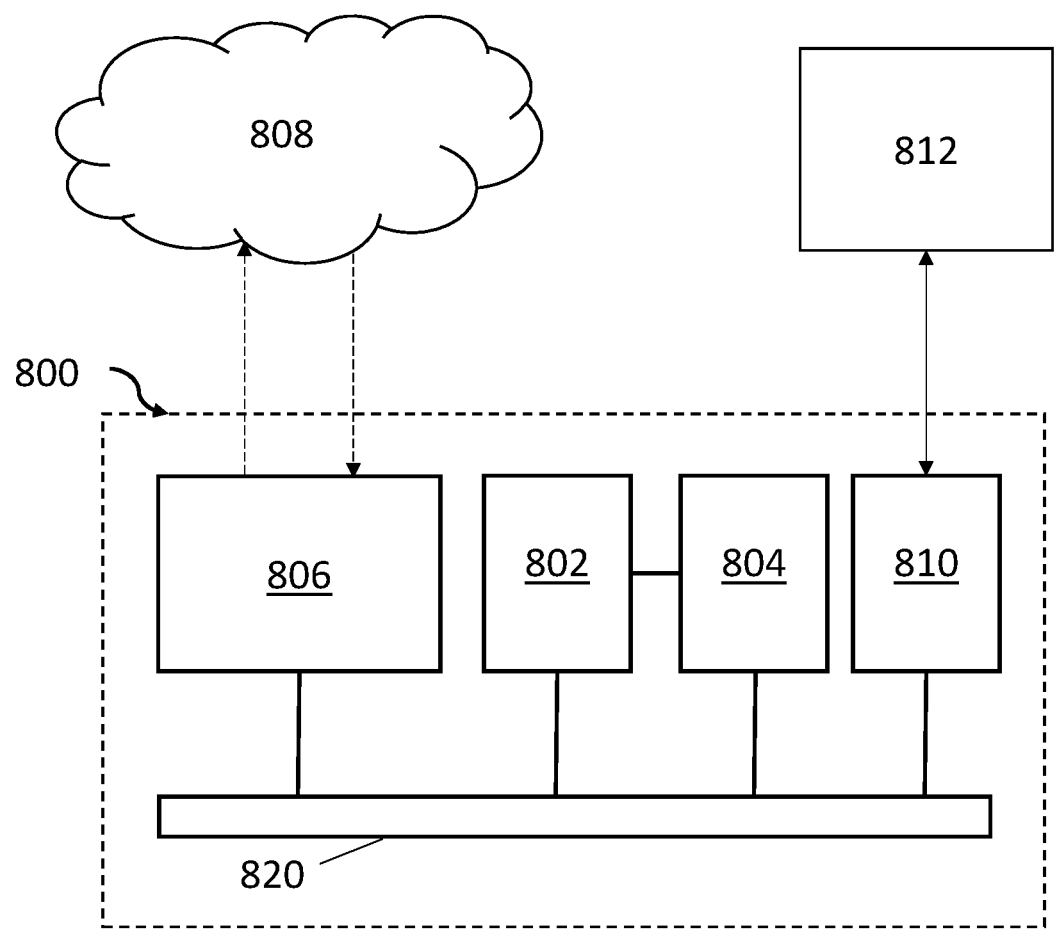
FIG. 8 shows a computing device that can be used to implement one or more of the methods described herein, according to embodiments.

The computing device 800 of FIG. 8 includes a network interface 806 which can be communicatively connected to a network 808 to receive data, such as data related resource use, supplier resource availability, user resource usage data and/or other data. The computing device 800 can accumulate the data from the network 808 into a dataset in the storage 802.

Storage 802 in the example of FIG. 8 includes computer program instructions configured to, when processed by at least one processor 804, implement a method for managing resources associated with an inventory management system, in accordance with any of the example methods described herein. The computer program instructions and data may be stored in an accessible non-transitory computer-readable medium and loaded into memory, for example the storage 802.

The computing device 800 may also include an interface 810 for a user interface 812. The interface 810 and user interface 812 may in conjunction provide a user with the ability to interact with the computing device 800 to input commands, data, and/or other information. The components of the computing device 800 in the example of FIG. 8 are interconnected using a system bus 820. This allows data to be transferred between the various components of the computing device 800.

The above embodiments are to be understood as illustrative examples of the present disclosure. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. An inventory management system for use in managing resources, the system comprising:
   an artificial intelligence engine; and
   at least one memory and at least one processor, the memory storing executable instructions, which, when executed by the at least one processor, cause the at least one processor to:
   receive, by the at least one processor, a resource request, from a user, the resource request indicating a request for a data connection having a required bandwidth;
   identify, by the at least one processor, one or more resources from a pool of resources managed by the inventory management system that can fulfil the resource request, the one or more resources comprising a data connection having a physical capacity that supports the required bandwidth;
   generate, by the at least one processor, a smart contract comprising a resource service agreement for the identified one or more resources;
   store, by the at least one processor, data associated with the generated smart contract in a blockchain;
   controlling, by the at least one processor and based on the smart contract, access to the identified one or more resources to the user;
   monitor, by the at least one processor, usage of the one or more identified resources provisioned to the user;
   update, by the at least one processor, the data associated with the generated smart contract stored in the blockchain to record actual usage of the one or more identified resources by the user in a given time period, thereby generating an immutable record of the resource service agreement for the identified one or more resources and the actual usage of the identified one or more resources;
   generate, by the at least one processor, a settlement request based on the updated data associated with the smart contract stored in the blockchain;
   analyse, by the at least one processor, the data associated with the generated smart contract in the blockchain to identify an over-utilization or under-utilization of the actual usage of the identified one or more resources associated with the generated smart contract;
   generate, by the artificial intelligence engine, based on the identified over-utilization or under-utilization, a modified smart contract for one or more different resources from the pool of resources in order to optimize the use of the pool of resources, the one or more different resources comprising a further data connection having a further physical capacity associated with the identified over-utilization or under-utilization;
   cause, by the at least one processor, the modified smart contract to be presented in a graphical user interface, the modified smart contract comprising a modified resource service agreement for the one or more different resources;

receive, by the at least one processor and from the user, agreement of the modified smart contract; and controlling, by the at least one processor and based on the modified smart contract, access to the one or more different resources to the user.

2. The inventory management system of claim 1, wherein the executable instructions, when executed by the at least one processor, cause the at least one processor to:

generate, by the at least one processor, one or more rules, the one or more rules defining one or more of resource usage thresholds, resource usage limits, payment terms and dispute resolution mechanisms; and store, by the at least one processor, the one or more rules in association with the generated smart contract on the blockchain.

3. The inventory management system of claim 1, wherein the executable instructions, when executed by the at least one processor, cause the at least one processor to:

identify, by the at least one processor, based on the received resource request, a smart contract stored on the blockchain associated with a similar resource request;

extract, by the at least one processor, from the identified smart contract, one or more parameters; and generate, by the at least one processor, the smart contract using the one or more extracted parameters.

4. The inventory management system of claim 3, wherein the step of identifying, by the at least one processor, a smart contract stored on the blockchain associated with a similar resource request is performed by the artificial intelligence engine configured to analyse one or more parameters of the resource request and identify one or more smart contracts stored on the blockchain based on their similarity to the analysed parameters.

5. The inventory management system of claim 1, wherein the executable instructions, when executed by the at least one processor, cause the at least one processor to:

receive, by the at least one processor, from the user, an agreement document;

apply, by the at least one processor, an optical character recognition process to the agreement document, to extract one or more parameters; and generate, by the at least one processor, the smart contract using the one or more extracted parameters.

6. The inventory management system of claim 1, wherein the executable instructions, when executed by the at least one processor, cause the at least one processor to:

configure or implement, by the at least one processor, an application programming interface, API, wherein the API is arranged to:

receive, from the user, an agreement document;

process the agreement document to extract one or more parameters; and generate the smart contract using the one or more extracted parameters.

7. The inventory management system of claim 1, wherein the generated smart contract comprises a contract refresh criterion which, when met, causes the at least one processor of the inventory management system to update the data associated with the generated smart contract and store the updated data in the blockchain to record actual usage of the one or more identified resources by the user in a given time period.

8. The inventory management system of claim 1, wherein the executable instructions, when executed by the at least one processor, cause the at least one processor to:

compare, by the at least one processor, the generated smart contract with a set of required parameters for the generated smart contract;

determine, by the at least one processor, that the generated smart contract is missing one or more required parameters from the set of required parameters; and generate, by the at least one processor, a notification requesting manual amendment of the generated smart contract.

9. The inventory management system of claim 1, wherein the artificial intelligence engine is configured to generate the smart contract based on the received resource request by:

identifying based on the received resource request, a smart contract stored on a blockchain associated with a similar resource request;

extracting from the identified smart contract, one or more parameters for the resource service agreement;

generating one or more suggested parameters for a missing parameter of the resource service agreement; and generating the resource service agreement using the one or more extracted parameters and using the one or more suggested parameters whereby to generate the smart contract, wherein if the artificial intelligence engine generates more than one suggested parameter, generating the resource service agreement using the one or more suggested parameters comprises analyzing, by the artificial intelligence engine, the more than one suggested parameter to identify a best-guess suggested parameter.

10. The inventory management system of claim 1, further comprising:

a blockchain manager, configured to communicate with a plurality of processing nodes, wherein each processing node maintains a copy of the blockchain and updates the blockchain in conjunction with the other processing nodes of the plurality of processing nodes, wherein the blockchain manager is further configured to:

generate configuration settings for a new processing node;

send, to one of the said processing nodes, the generated configuration settings and a copy of the current blockchain, for use in configuring the processing node as a remote blockchain processing node.

11. The inventory management system of claim 1, wherein the executable instructions, when executed by the at least one processor, cause the at least one processor to:

receive, by the at least one processor, a blockchain viewing request, from a user, comprising a user identifier and one or more security credentials;

verify, by the at least one processor, the one or more security credentials;

identify, by the at least one processor, one or more smart contracts stored on the blockchain that are associated with the user identifier; and arrange, by the at least one processor, viewing access, for the user, to the identified one or more smart contracts.

12. The inventory management system of claim 1, wherein the executable instructions, when executed by the at least one processor, cause the at least one processor to:

determine, by the at least one processor, a discrepancy between the actual usage of the one or more resources associated with the generated smart contract and the resource service agreement; and generate, by the at least one processor, a discrepancy notification.

13. The inventory management system of claim 1, wherein the executable instructions, when executed by the at least one processor, cause the at least one processor to:
  analyse, by the at least one processor, the data associated with a plurality of smart contracts stored in the blockchain to generate resource usage statistics;
  generate, by the at least one processor, one or more graphic representations of the resource usage statistics; and
  transmit, by the at least one processor, the generated graphic representations to a user interface, to enable the generated graphic representations to be presented to a user.

14. The inventory management system of claim 1, wherein the executable instructions, when executed by the at least one processor, cause the at least one processor to:
  analyse, by the at least one processor, the data associated with a plurality of smart contracts stored in the blockchain to generate resource usage data;
  store, by the at least one processor, the resource usage data for use in generating further smart contracts.

15. The inventory management system of claim 1, wherein each resource in the pool of resources is associated with one or more tokens, each token being stored in a centralised wallet,
  wherein each time a resource is allocated to a user, a token associated with the resource is moved, by the at least one processor, from the centralised wallet to a user wallet, or a token associated with the resource is removed, by the at least one processor, from the centralised wallet and recreated in a user wallet, and
  wherein when all tokens associated with a particular resource have been moved or removed, by the at least one processor, from the centralised wallet, the particular resource is no longer available to fulfil future resource requests.

16. The inventory management system of claim 1, wherein the executable instructions, when executed by the at least one processor, cause the at least one processor to:
  identify, by the at least one processor, if the user has an associated user wallet, wherein if the user has an associated wallet, the at least one processor of the inventory management system is arranged to move a token associated with the identified one or more resources from a wallet associated with the pool of resources to the user wallet, or create a token associated with the identified one or more resources in the user wallet, in conjunction with provisioning the identified one or more resources to the user,
  wherein if there is no user wallet associated with the user, the executable instructions, when executed by the at least one processor, cause the at least one processor to:
    create, by the at least one processor, a user wallet for storing tokens associated with resources available to the user; and
    move, by the at least one processor, a token associated with the identified one or more resources from a wallet associated with the pool of resources to the created user wallet, or create, by the at least one processor, a token associated with the identified one or more resources in the created user wallet.

17. The inventory management system of claim 1, wherein the executable instructions, when executed by the at least one processor, cause the at least one processor to:
  receive, by the at least one processor, an offer, from a supplier, for supplying one or more resources;
  generate, by the artificial intelligence engine, a second smart contract comprising a resource supply agreement for the supply of one or more of the offered resources; and
  add, by the at least one processor, a representation of the one or more resources covered by the resource supply agreement to the pool of resources, thereby indicating that said resources are available to fulfil resource requests.

18. The inventory management system of claim 17, wherein the executable instructions, when executed by the at least one processor, cause the at least one processor to:
  monitor, by the at least one processor, usage of the resources associated with the second generated smart contract over time,
  wherein, when a contract refresh criterion specified in the second generated smart contract is reached, the executable instructions, when executed by the at least one processor, cause the at least one processor to:
    update, by the at least one processor, the data associated with the second generated smart contract stored in the blockchain to record actual usage of the resources associated with the second generated smart contract in a given time period;
    generate, by the at least one processor, a remittance for the actual usage of the resources associated with the second generated smart contract, in accordance with the resource supply agreement; and
    refresh, by the at least one processor, the second generated smart contract, recording the generated remittance.

19. The inventory management system of claim 18 wherein the executable instructions, when executed by the at least one processor, cause the at least one processor to, when the contract refresh criterion specified in the second generated smart contract is reached:
  compare, by the at least one processor, the recorded actual usage of the resources associated with the second generated smart contract with the resource supply agreement, wherein if the recorded actual usage does not match the resource supply agreement, the inventory management system is arranged to:
    limit, by the at least one processor, the generated remittance to cover only the recorded actual usage;
    generate, by the at least one processor, a dispute notification comprising the updated data and the resource supply agreement of the second generated smart contract; and
    send, by the at least one processor, the dispute notification to a dispute management system.

20. The inventory management system of claim 18, wherein the executable instructions, when executed by the at least one processor, cause the at least one processor to, when the contract refresh criterion specified in the second generated smart contract is reached:
  compare, by the at least one processor, the recorded actual usage of the resources associated with the second generated smart contract with the resource supply agreement, wherein if the recorded actual usage does not match the resource supply agreement, the inventory management system is arranged to:
    determine, by the at least one processor, if the second generated smart contract comprises one or more rules defining a resource usage threshold; and
    generating, by the at least one processor, the remittance only if the recorded actual usage differs from the updated data of the second generated smart contract by less than the resource usage threshold.

21. The inventory management system of claim 1, wherein the executable instructions, when executed by the at least one processor, cause the at least one processor to:
determine, by the at least one processor, a data format of the received resource request;
identify, by the at least one processor, an Application Programming Interface for converting the data format of the received resource request into a data format used by the inventory management system; and
convert, by the at least one processor, using the identified Application Programming Interface, the received resource request to the data format used by the inventory management system.

22. A computer-implemented method comprising:
receiving, by at least one processor, a resource request, from a user, the resource request indicating a request for a data connection having a required bandwidth;
identifying, by the at least one processor, one or more resources from a pool of resources managed by the inventory management system that can fulfil the resource request, the one or more resources comprising a data connection having a physical capacity that supports the required bandwidth;
generating, by the at least one processor, a smart contract comprising a resource service agreement for the identified one or more resources;
storing, by the at least one processor, data associated with the generated smart contract in a blockchain;
controlling, by the at least one processor and based on the smart contract, access to the identified one or more resources to the user;
monitoring, by the at least one processor, usage of the one or more identified resources provisioned to the user;
updating, by the at least one processor, the data associated with the generated smart contract stored in the blockchain to record actual usage of the one or more identified resources by the user in a given time period, thereby generating an immutable record of the resource service agreement for the identified one or more resources and the actual usage of the identified one or more resources;
generating, by the at least one processor, a settlement request based on the updated data associated with the smart contract stored in the blockchain;
analysing, by the at least one processor, the data associated with the generated smart contract in the blockchain to identify an over-utilization or under-utilization of the actual usage of the identified one or more resources associated with the generated smart contract;
generating, by an artificial intelligence engine, based on the identified over-utilization or under-utilization, a modified smart contract for one or more different resources from the pool of resources in order to optimize the use of the pool of resources, the one or more different resources comprising a further data connection having a further physical capacity associated with the identified over-utilization or under-utilization; and
causing, by the at least one processor, the modified smart contract to be presented in a graphical user interface, the modified smart contract comprising a modified resource service agreement for the one or more different resources;
receive, by the at least one processor and from the user, agreement of the modified smart contract; and
controlling, by the at least one processor and based on the modified smart contract, access to the one or more different resources to the user.

23. A non-transitory computer readable medium storing instructions, which when executed by at least one processor, performs a method for managing resources, the method comprising:
receiving, by at least one processor, a resource request, from a user, the resource request indicating a request for a data connection having a required bandwidth;
identifying, by the at least one processor, one or more resources from a pool of resources managed by the inventory management system that can fulfil the resource request, the one or more resources comprising a data connection having a physical capacity that supports the required bandwidth;
generating, by the at least one processor, a smart contract comprising a resource service agreement for the identified one or more resources;
storing, by the at least one processor, data associated with the generated smart contract in a blockchain;
controlling, by the at least one processor and based on the smart contract, access to the identified one or more resources to the user;
monitoring, by the at least one processor, usage of the one or more identified resources provisioned to the user;
updating, by the at least one processor, the data associated with the generated smart contract stored in the blockchain to record actual usage of the one or more identified resources by the user in a given time period, thereby generating an immutable record of the resource service agreement for the identified one or more resources and the actual usage of the identified one or more resources;
generating, by the at least one processor, a settlement request based on the updated data associated with the smart contract stored in the blockchain;
analysing, by the at least one processor, the data associated with the generated smart contract in the blockchain to identify an over-utilization or under-utilization of the actual usage of the identified one or more resources associated with the generated smart contract;
generating, by an artificial intelligence engine, based on the identified over-utilization or under-utilization, a modified smart contract for one or more different resources from the pool of resources in order to optimize the use of the pool of resources, the one or more different resources comprising a further data connection having a further physical capacity associated with the identified over-utilization or under-utilization; and
causing, by the at least one processor, the modified smart contract to be presented in a graphical user interface, the modified smart contract comprising a modified resource service agreement for the one or more different resources;
receive, by the at least one processor and from the user, agreement of the modified smart contract; and
controlling, by the at least one processor and based on the modified smart contract, access to the one or more different resources to the user.

* * * * *